United States Patent [19]

Tachibana et al.

[11] Patent Number: 5,084,867
[45] Date of Patent: Jan. 28, 1992

[54] ROUTING METHOD AND ROUTING SYSTEM FOR SWITCHING SYSTEM HAVING A PLURALITY OF PATHS

[75] Inventors: Tetsuo Tachibana, Kawasaki; Toshimasa Fukui, Yokohama; Tetsuo Nishino, Kawasaki; Osamu Isono, Kawasaki; Ryuji Hyodo, Kawasaki; Eisuke Iwabuchi, Yokohama, all of Japan

[73] Assignee: Fujitsu Limited, Kawasaki, Japan

[21] Appl. No.: 584,653

[22] Filed: Sep. 19, 1990

[51] Int. Cl.[5] .................................................. H04J 3/26
[52] U.S. Cl. ......................................... 370/60; 370/16; 370/54
[58] Field of Search .................. 370/60, 54, 16, 94.1

[56] References Cited

U.S. PATENT DOCUMENTS

| | | | |
|---|---|---|---|
| 4,884,263 | 11/1989 | Suzuki | 370/16 |
| 4,947,388 | 8/1990 | Kuwahara et al. | 370/60 |
| 4,964,119 | 10/1990 | Endo et al. | 370/60 |
| 4,993,018 | 2/1991 | Hajikano et al. | 370/54 |

FOREIGN PATENT DOCUMENTS 123549 5/1989 Japan .
289342 11/1989 Japan .

OTHER PUBLICATIONS

Kawarasaki et al., "Perspective of ATM Communication Technique,—Evolution of Broadband Communication Network", Journal of Electronic Information Communication Society, vol. 71, No. 8, Aug. 1988, pp. 806-814.

Primary Examiner—Douglas W. Olms
Assistant Examiner—Min Jung
Attorney, Agent, or Firm—Staas & Halsey

[57] ABSTRACT

A routing method routes cells which are transferred through one of a plurality of paths within an asynchronous transfer mode (ATM) switching system selected by routing information. The routing method includes the steps of adding first routing information to incoming cells at an input stage of the ATM switching system when supplying the cells to the ATM switching system, generating a route switching confirmation cell in response to a route switching instruction and for adding second routing information to incoming cells thereafter so as to supply the route switching confirmation cell and the cells added with the second routing information to the ATM switching system. The second routing information is different from the first routing information and is determined by the route switching instruction, comparing routing information. The method also includes the cells with the second routing information at an output stage of the ATM switching system in response to the route switching instruction, and outputting each cell from the ATM switching system having routing information different from the second routing information as it is. The method also includes temporarily storing each cell from the ATM switching system having routing information identical to the second routing information and reading out and outputting the stored cell after the route switching confirmation cell is output from the ATM switching system.

31 Claims, 19 Drawing Sheets

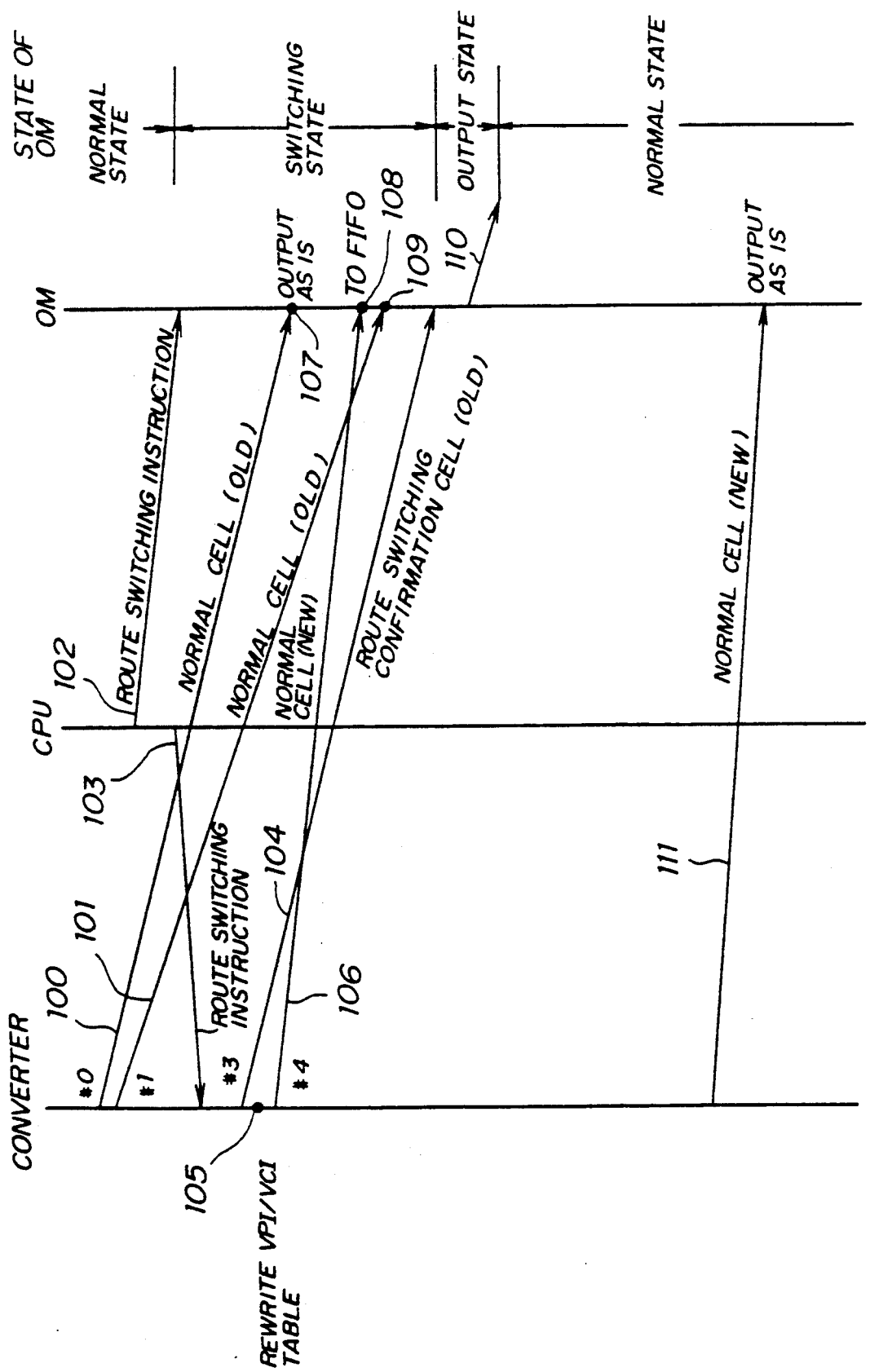

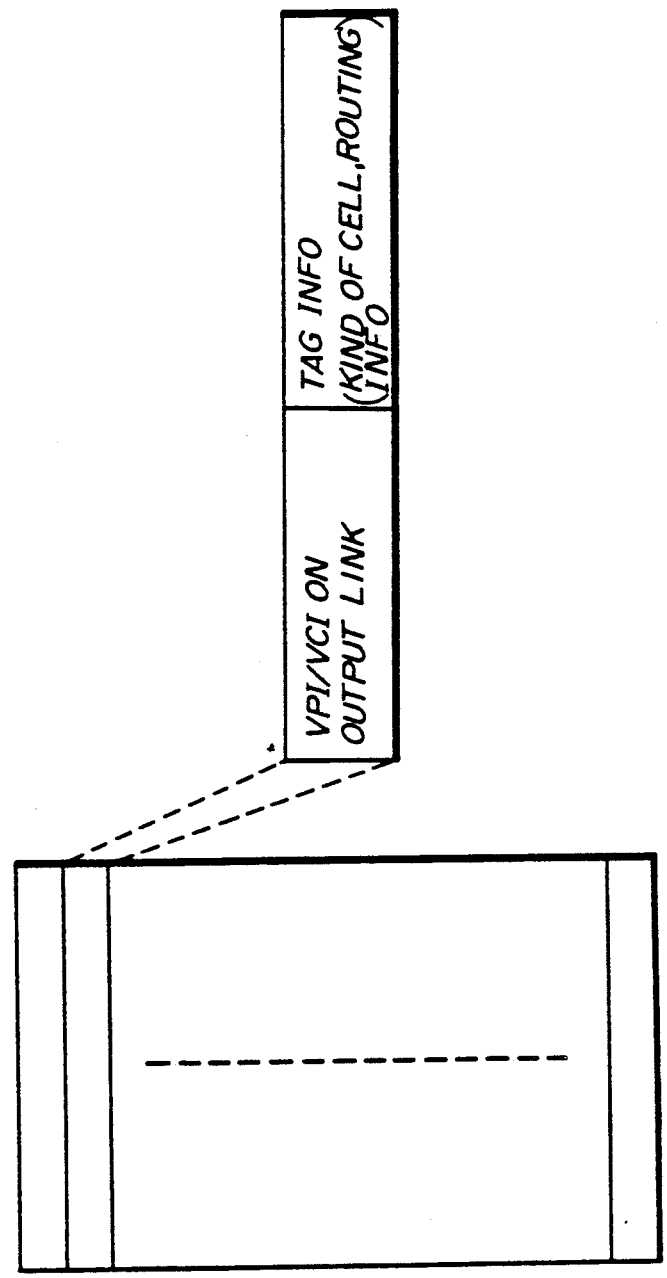

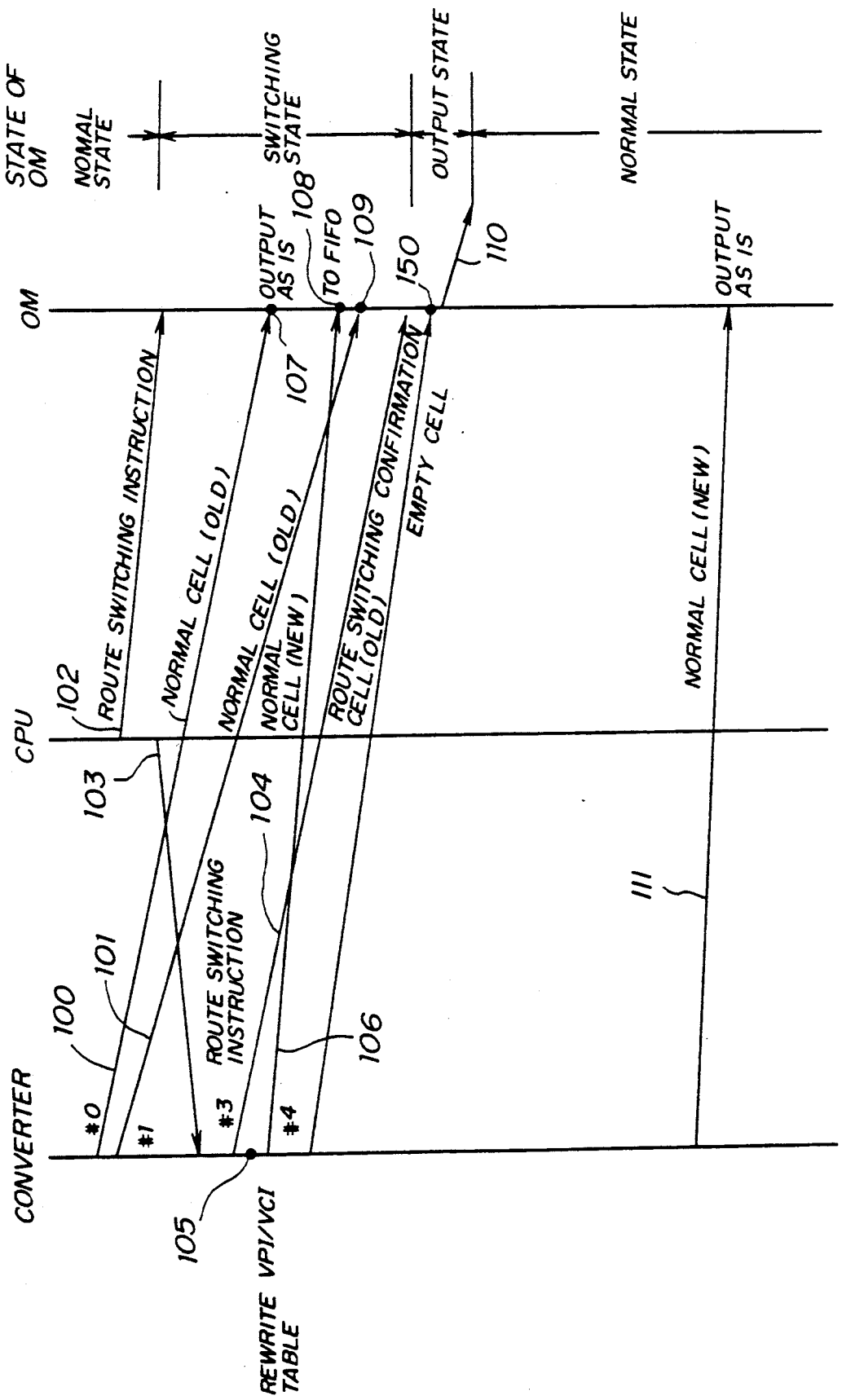

ROUTING METHOD AND ROUTING SYSTEM FOR SWITCHING SYSTEM HAVING A PLURALITY OF PATHS

BACKGROUND OF THE INVENTION

The present invention generally relates to routing methods and routing systems, and more particularly to a routing method and a routing system for a switching system having a plurality of paths.

For example, in order to freely transfer files at a high speed, it is necessary to use a high-speed broadband communication network. In such a communication network, the communication band must be several tens of Mbits/s or greater which is extremely large compared to a communication band for telephones and data communications which is in the range of 64 kbits/s×n. Recently, there is active research in this field of broadband communication, and the asynchronous transfer mode (ATM) communication is regarded as an effective method of communication.

The ATM communication technique is proposed in Kawarasaki et al., "Perspective of ATM Communication Technique,—Evolution of Broadband Communication Network", Journal of Electronic Information Communication Society, Vol.71, No.8, Aug. 1988, pp.806–814. According to the ATM communication, digitized information such as audio, data and video information are divided into blocks which have a fixed length and are called cells. The ATM is a label multiplexing in which each cell is transmitted with a destination information which is added to a header of the cell and a channel is identified from a label within the header. In the ATM, the occurrence of the cells is based on an information transmission request and is asynchronous. Hence, the ATM is different from a synchronous transfer mode (STM) which is a time position multiplexing in which a channel is identified from a time position of a time slot within a frame. In the STM, the time slot occurs periodically regardless of the existence of information transmission.

The ATM transmits the information after converting the information into a unified format, that is, cells. The header of the cell must include channel identification, routing information and the like. The routing information indicates which route is to be taken within an ATM switching system. The ATM switching system directs the cell to a desired output port by selecting connections of each of unit switches based on the routing information which is added to the header of the cell.

FIG.1 shows an example of an ATM switching system having 3 stages of self routing modules (SRMs), where each SRM has N input links and N output links. For example, a route within the ATM switching system is switched during communication, and FIG.1 shows a case where a route "a" indicated by a one-dot chain line is switched to a route "b" indicated by a phantom line. When a fault occurs in a certain route or a congestion occurs in a local part within the switching system, it is necessary to switch the route to a route which still has margin in its capacity. The congestion is caused by an inappropriate call accept control logic and when a user inputs a number of cells exceeding a declared value, and in the latter case, the cells input exceeding the declared value are disposed, for example.

When the route is simply switched, the cell which is transferred through the new route after the switching of the route may go ahead of the cell which is transferred through the old route before the switching of the route. In other words, since the new route after the switching of the route is free compared to the old route, the cell sequence is disordered at the output end of the ATM switching system. When the cell sequence is disordered, it is no longer possible to carry out a positive signal processing. Hence, when switching the route, it is necessary to take measures to prevent the cell which is transferred through the new route after the switching of the route from going ahead of the cell which is transferred through the old route before the switching of the route.

Conventionally, virtual channel identification (VCI) converters $2_1$ and $2_2$ shown in FIG.2 which are provided in a stage preceding an ATM switching system 1 having the structure shown in FIG.1 have buffering functions so as to prevent the cell which is transferred through the new route after the switching of the route from going ahead of the cell which is transferred through the old route before the switching of the route.

Each cell has a VCI number added to an ATM header thereof, and cells having various VCI numbers are transmitted time sequentially. A VCI discriminator 3 shown in FIG.2 discriminates the VCI number of each cell, and a reference is made to a VCI table 4 so as to obtain via selectors 5a and 5b those cells having the VCI numbers which are to be processed. In other words, when a route switching instruction is received from a central processing unit (CPU) 6, those cells which have predetermined VCI numbers and are to take the new route within the ATM switching system 1 are temporarily stored in a first-in-first-out (FIFO) memory 7 by the switching of the selectors 5a and 5b, while those cells which are to take the old route within the ATM switching system 1 are passed as they are by the switching of the selectors 5a and 5b. The cells which are to take the new route and are stored in the FIFO memory 7 are read out after a predetermined time which is preset by a timer 8. This predetermined time corresponds to a maximum tolerable delay time within the ATM switching system 1 such that the cell which is transferred through the new route after the switching of the route is prevented from going ahead of the cell which is transferred through the old route before the switching of the route.

When switching the route in the conventional system shown in FIG.2, the cells which are to take the new route within the ATM switching system 1 are temporarily stored in the VCI converter $2_2$ which is provided in the stage preceding the ATM switching system 1 and are read out and input to the ATM switching system 1 after the predetermined time which is preset by the timer 8 within the VCI converter $2_2$. In other words, the cells which are to take the new route must wait before being subjected to the switching process in the ATM switching system 1. For this reason, a long delay time is introduced between the cells having the various VCI numbers, and there is a problem in that a subsequent signal processing cannot be carried out efficiently within a short time because of the delay introduced at the input stage of the ATM switching system 1.

SUMMARY OF THE INVENTION

Accordingly, it is a general object of the present invention to provide a novel and useful routing method and routing system in which the problems described above are eliminated.

Another and more specific object of the present invention is to provide a routing method for routing cells which are transferred through one of a plurality of paths within an asynchronous transfer mode switching system selected by routing information, where each of the cells include a header and an information field and the routing method comprises the steps of adding first routing information to incoming cells at an input stage of the asynchronous transfer mode switching system when supplying the cells to the asynchronous transfer mode switching system, generating a route switching confirmation cell in response to a route switching instruction and for adding second routing information to incoming cells thereafter so as to supply the route switching confirmation cell and the cells added with the second routing information to the asynchronous transfer mode switching system, where the second routing information is different from the first routing information and is determined by the route switching instruction, comparing routing information of the cells with the second routing information at an output stage of the asynchronous transfer mode switching system in response to the route switching instruction, outputting each cell from the asynchronous transfer mode switching system having routing information different from the second routing information as it is, and temporarily storing each cell from the asynchronous transfer mode switching system having routing information identical to the second routing information and reading out and outputting the stored cell after the route switching confirmation cell is output from the asynchronous transfer mode switching system. According to the routing method of the present invention, it is possible to prevent a long delay time from occurring between the cells, and accordingly carry out a subsequent signal processing efficiently within a short time.

Still another object of the present invention is to provide a routing system for routing cells which are transferred through one of a plurality of paths within an asynchronous transfer mode switching system selected by routing information, where each of the cells include a header and an information field and the routing system comprises a converter part coupled to an input stage of the asynchronous transfer mode switching system and including first means for adding first routing information to incoming cells when supplying the cells to the asynchronous transfer mode switching system and second means for generating a route switching confirmation cell in response to a route switching instruction and for adding second routing information to incoming cells thereafter so as to supply the route switching confirmation cell and the cells added with the second routing information to the asynchronous transfer mode switching system, where the second routing information is different from the first routing information and is determined by the route switching instruction, and an output module part coupled to an output stage of the asynchronous transfer mode switching system including third means for comparing routing information of the cells with the second routing information in response to the route switching instruction, fourth means for outputting each cell from the asynchronous transfer mode switching system having routing information different from the second routing information as it is and fifth means for temporarily storing each cell from the asynchronous transfer mode switching system having routing information identical to the second routing information and reading out and outputting the stored cell after the route switching confirmation cell is output from the asynchronous transfer mode switching system. According to the routing system of the present invention, it is possible to prevent a long delay time from occurring between the cells, and accordingly carry out a subsequent signal processing efficiently within a short time.

Other objects and further features of the present invention will be apparent from the following detailed description when read in conjunction with the accompanying drawings.

BRIEF DESCRIPTION OF THE DRAWINGS

FIG.9 shows an operation sequence of the first embodiment;

FIG.10 is a diagram for explaining a VPI/VCI table of the converter;

FIG.17 shows an operation sequence of the second embodiment.

DESCRIPTION OF THE PREFERRED EMBODIMENTS

Figure 1:
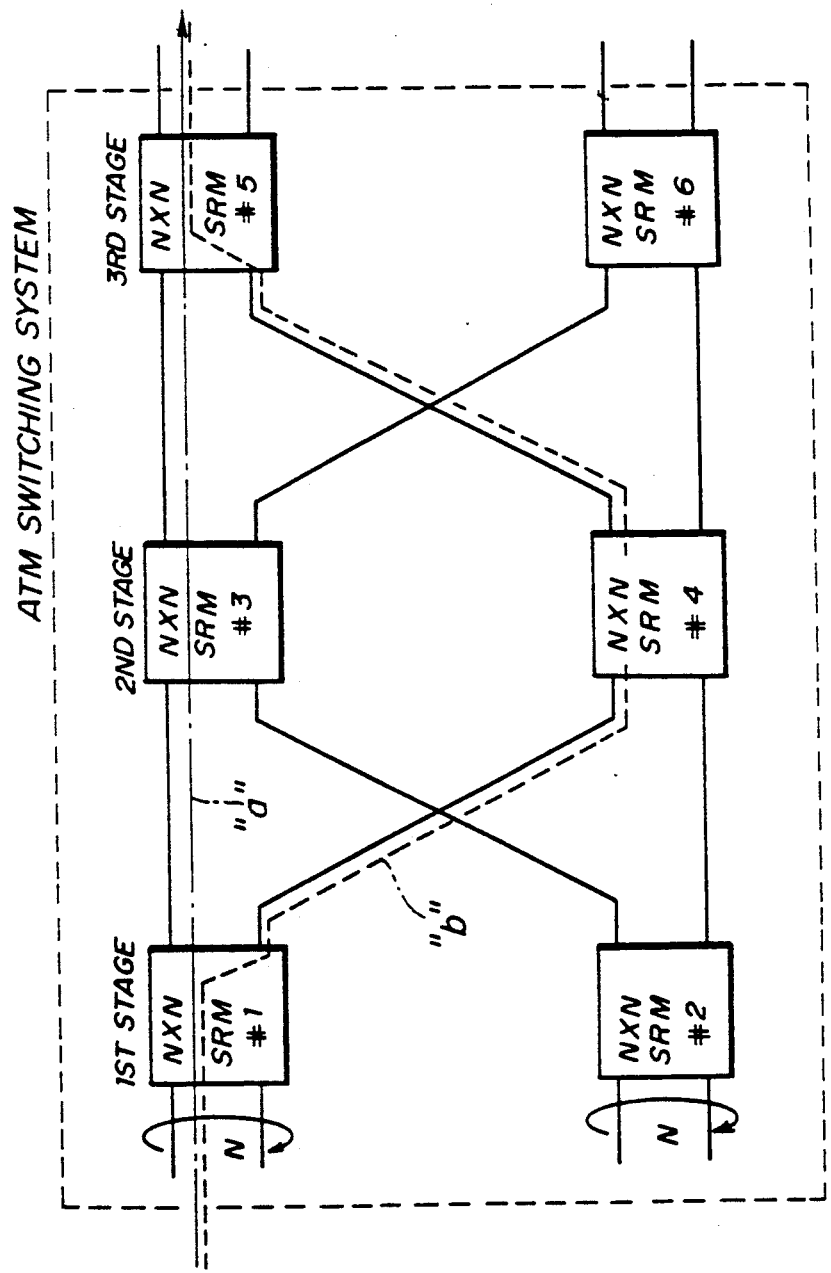
FIG.1 is a system block diagram of an example of a conventional ATM switching system having SRMs connected in a plurality of stages.
Figure 2:
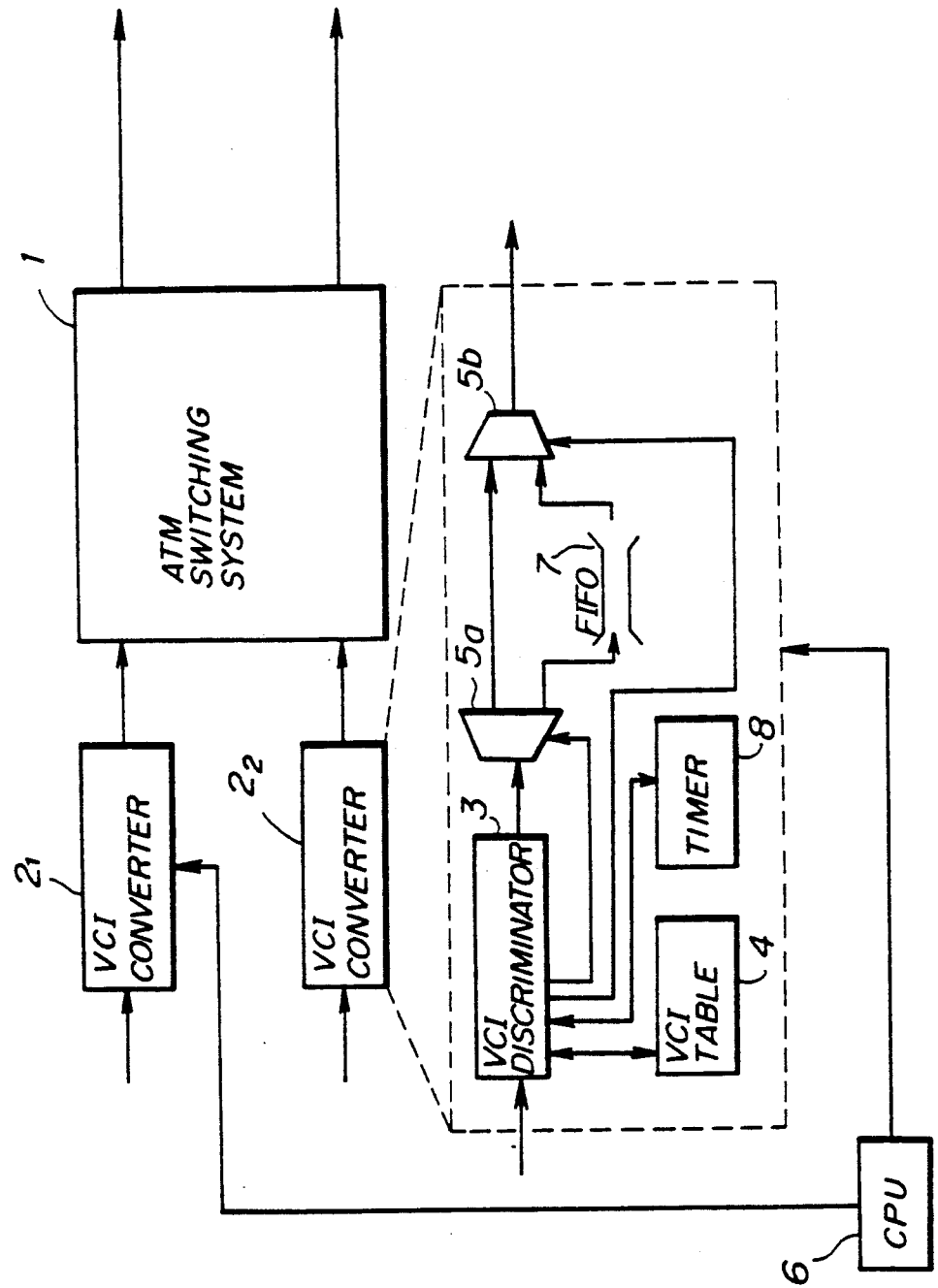
FIG.2 is a system block diagram for explaining a conventional routing system.
Figure 3:
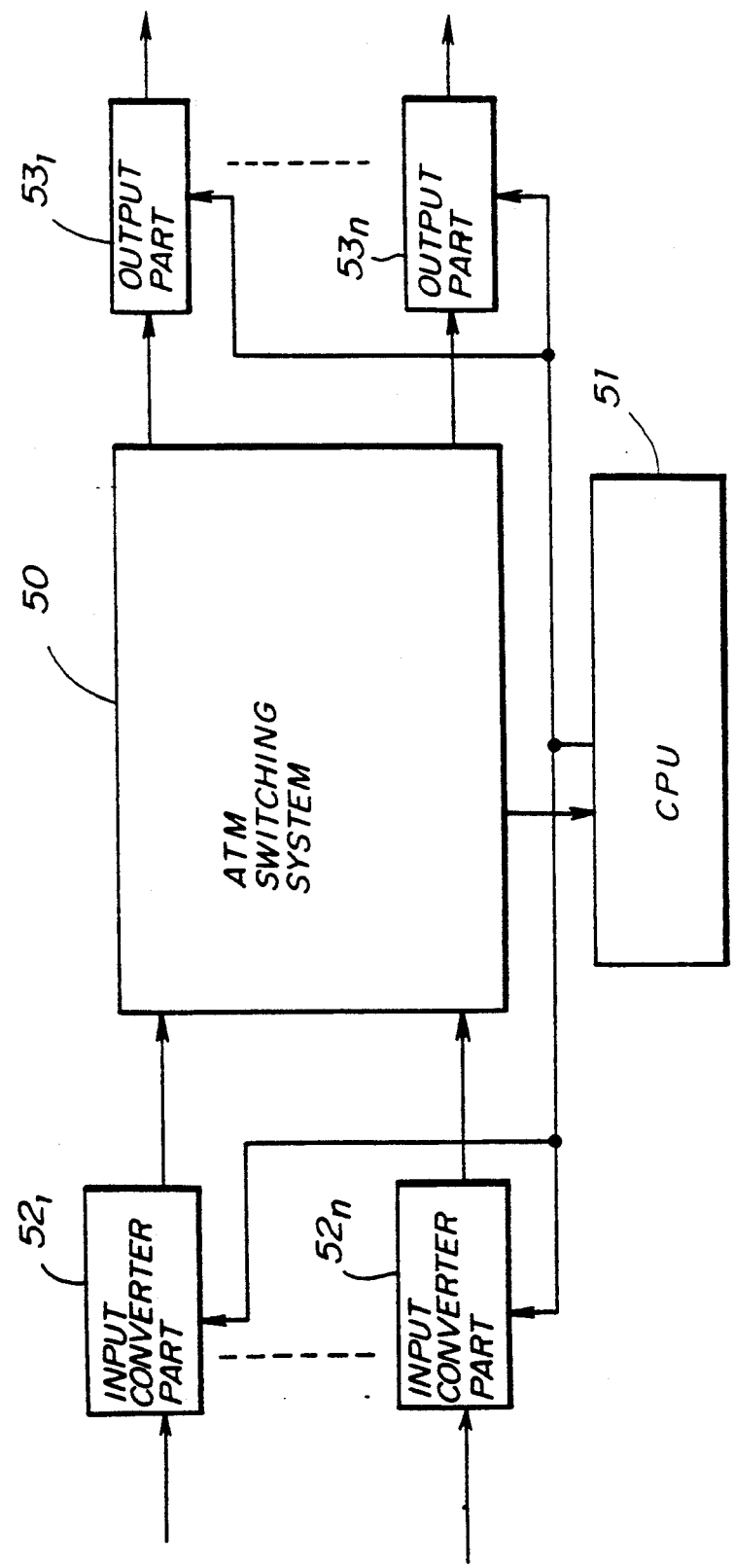
FIG.3 is a system block diagram for explaining an operating principle of the present invention.

First, a description will be given of an operating principle of the present invention, by referring to FIG.3. In FIG.3, an ATM switching system 50 includes a plurality of SRMs which are connected in a plurality of stages so that a switching of the route is possible A CPU 51 controls the entire system shown in FIG.3. Input converter parts $52_1$ through $52_n$ are provided in a stage preceding the ATM switching system 50 and normally add normal routing information to incoming cells. When a route switching instruction is received from the CPU 51, the input converter part $52_i$ generates a route switching confirmation cell and adds to the incoming cells thereafter new routing information which is determined by the route switching information, where i=1, ..., n. Output parts $53_1$ through $53_n$ are provided in a stage subsequent to the ATM switching system 50. The output part $53_i$ rewrites an internal table to the new routing information in response to the route switching instruction from the CPU 51 and compares the routing information added to the incoming cells with the new routing information written in the table. When the routing information added to the incoming cell differs from the new routing information written in the table, the output part $53_i$ outputs the incoming cell as it is. On the other hand, when the routing information added to the incoming cell matches the new routing information written in the table, the output part $53_i$ temporarily stores the incoming cell in a memory and reads out and outputs this cell from the memory after the route switching confirmation cell is received.

Therefore, the basic operation of the present invention can be summarized as follows. That is, the input converter part $52_i$ adds the route switching confirmation cell to the incoming cells when the route switching instruction is received from the CPU 51, and the input converter part $52_i$ outputs the incoming cells thereafter by adding thereto the new routing information. The ATM switching system 50 detects the routing information of the cells received from the input converter part $52_i$, and carries out the switching process by switching the links of SRMs based on the detected routing information. The output part $53_i$ rewrites the table to the new routing information and compares the routing information of the incoming cells with the new routing information written in the table. When the routing information of the incoming cell differs from the new routing information, it is judged that the incoming cell took the old route and the output part $53_i$ outputs the incoming cell as it is. On the other hand, when the routing information of the incoming cell matches the new routing information written in the table, it is judged that the incoming cell took the new route and the output part $53_i$ temporarily stores the incoming cell in the memory and reads out and outputs this cell from the memory after the route switching confirmation cell is received and output.

In the ATM switching system 50, the new route is free, and thus, the cell which takes the new route may go ahead of the cell which takes the old route. For this reason, the present invention temporarily stores the cell which takes the new route within the ATM switching system 50 before outputting the same to the output link, so as to prevent the cell which takes the new route from going ahead of the cell which takes the old route. The cell which takes the new route within the ATM switching system 50 is corrected by storing this cell in the memory of the output part $53_i$ which is provided in the stage subsequent to the ATM switching system 50. Hence, compared to the conventional system which stores the cell which is to take the new route for the predetermined time at the stage preceding the ATM switching system, the present invention does not introduce the long delay time between the cells and it is possible to efficiently carry out the subsequent signal processing within a short time.

Next, a description will be given of a first embodiment of the routing system according to the present invention, by referring to FIG.4. The routing system shown in FIG.4 includes an ATM switching system a VPI/VCI converter part 11, an output module (OM) part 12 and a CPU 13, where VPI stands for "virtual path identifier" and VCI stands for "virtual channel identifier". The ATM switching system 10 includes 2×2 SRMs #1 through #6 which are arranged in 3 stages. The VPI/VCI converter part 11 is provided in a stage preceding the ATM switching system 10 and is made up of converters #0 through #3 respectively having a structure shown in FIG.5. The output module part 12 is provided in a stage subsequent to the ATM switching system 10 and is made up of output modules #0 through #3 respectively having a structure shown in FIG.6. The CPU 13 controls the VPI/VCI converter part 11 and the output module part 12 as will be described later.

Figure 4:
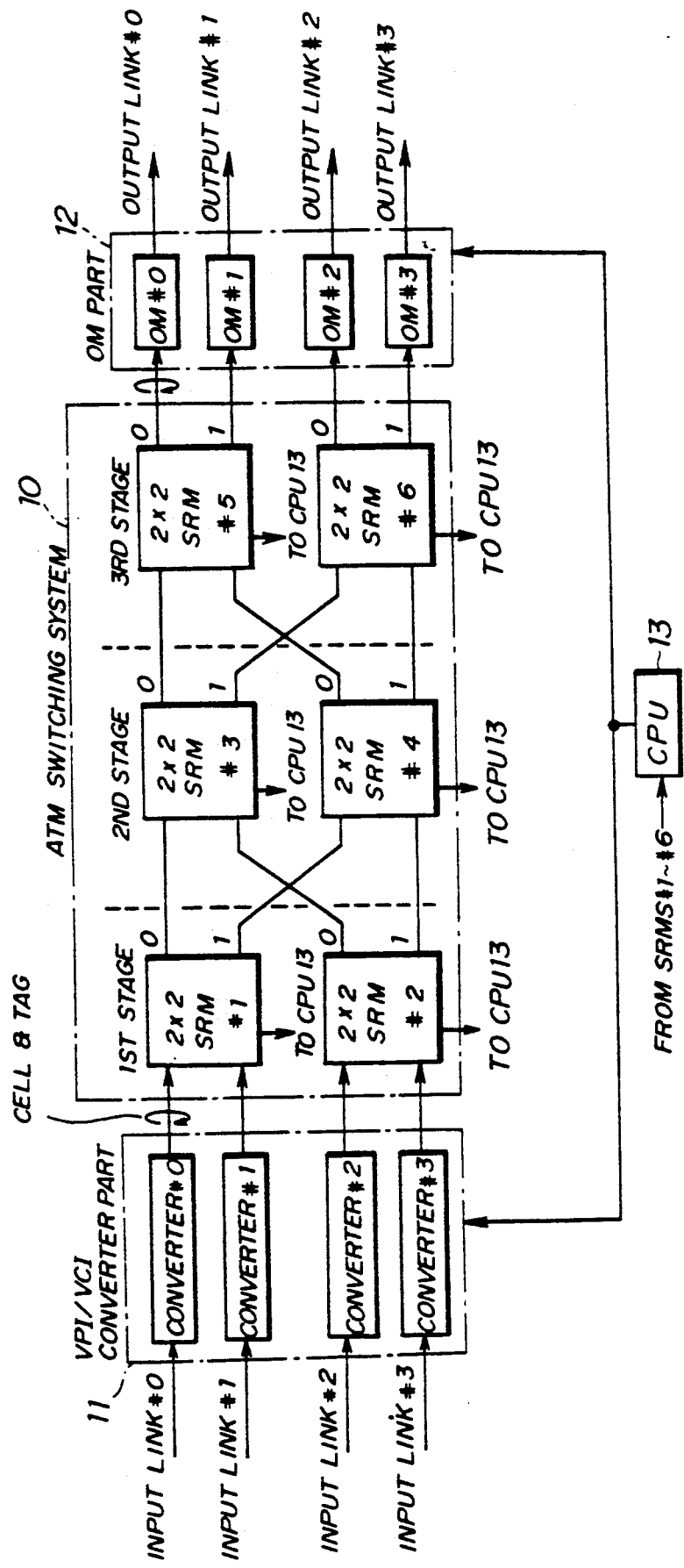
FIG.4 is a system block diagram showing a first embodiment of a routing system according to the present invention.
Figures 7A, 7B:
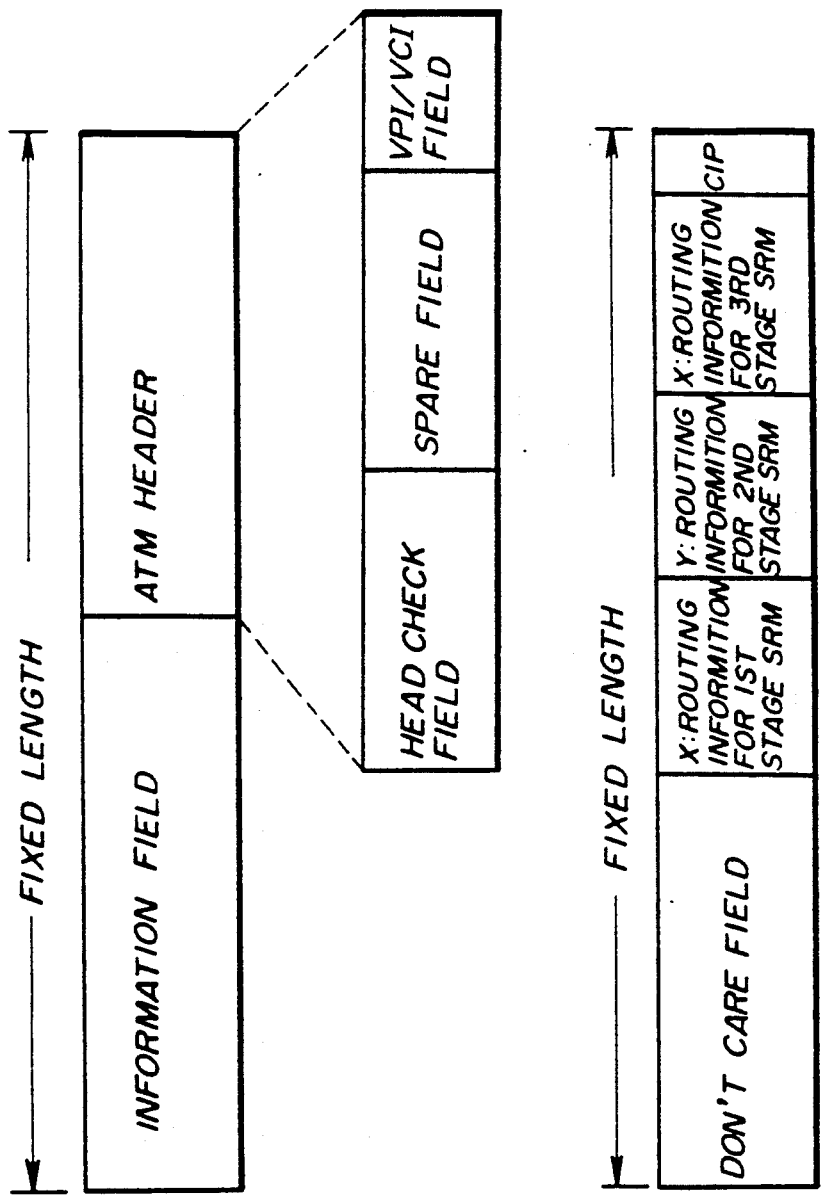
FIGS.7A and 7B are diagrams respectively showing formats of a cell and a tag.

Input links #0 through #3 and output links #0 through #3 shown in FIG.4 are lines for transferring cells which have a cell format shown in FIG.7A. Lines from output ends of the converters #0 through #3 to input ends of the output modules #0 through #3 transfer tags which have a tag format shown in FIG.7B. As shown in FIG.7A, each cell has an ATM header and an information field, and the ATM header includes a head check field, a spare field and a VPI/VCI field. On the other hand, as shown in FIG.7B, the tag includes a cell identification field CIP, routing information fields X, Y and Z for respectively indicating routing information of the SRMs in the first through third stages, and a don't care field. The cell identification field CIP indicates the kind of cell, that is, whether the cell is a normal cell (CIP=0) or a route switching confirmation cell (CIP=1). Hence, the tag is a kind of routing information.

A virtual channel is identified by the VPI and the VCI. But for the sake of convenience, it is assumed in this embodiment that the virtual channel is identified by the VCI alone to simplify the description. In actual practice, however, the virtual channel is identified by the VPI and the VCI or by the VPI alone, and the VPI may be fixed in the case where the virtual channel is identified by the VPI and the VCI. The terms VPI and VCI are defined by CCITT standards.

Figure 8A:
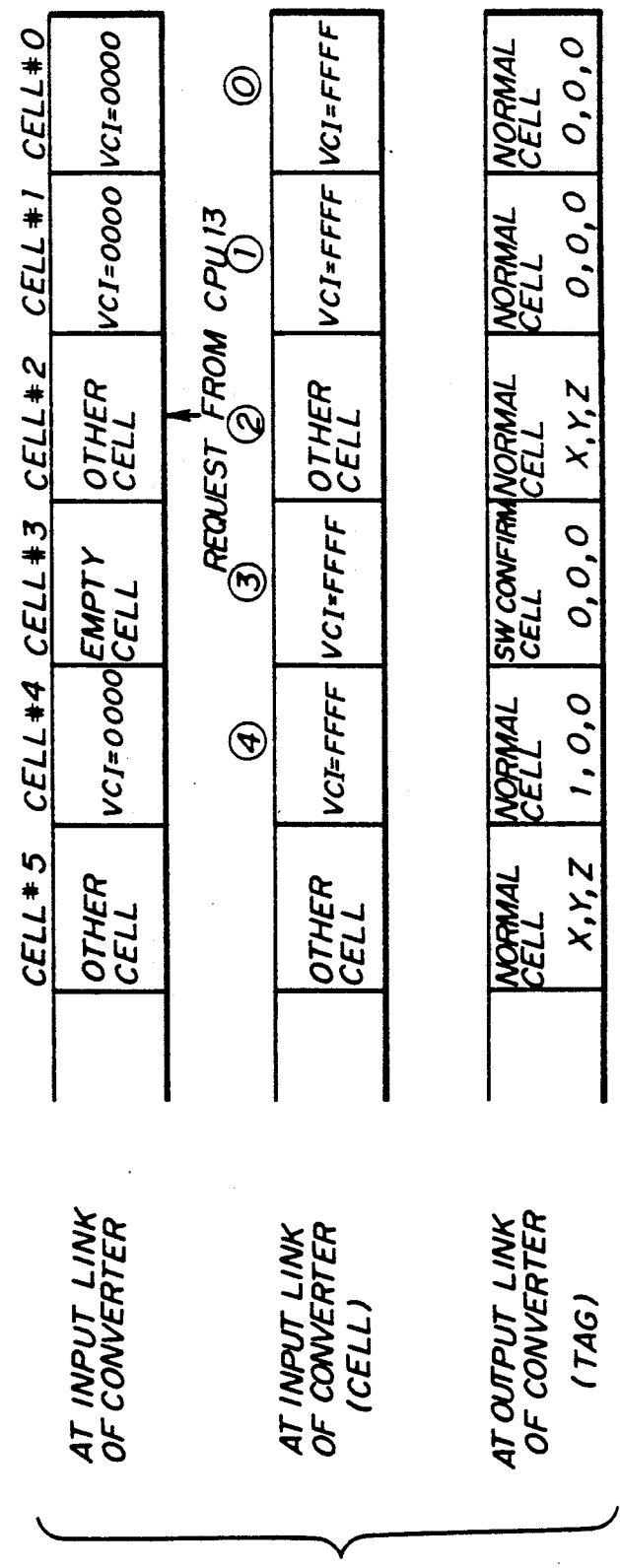
FIGS.8A and 8B are cell timing charts for explaining an operation of the first embodiment.
Figure 8B:
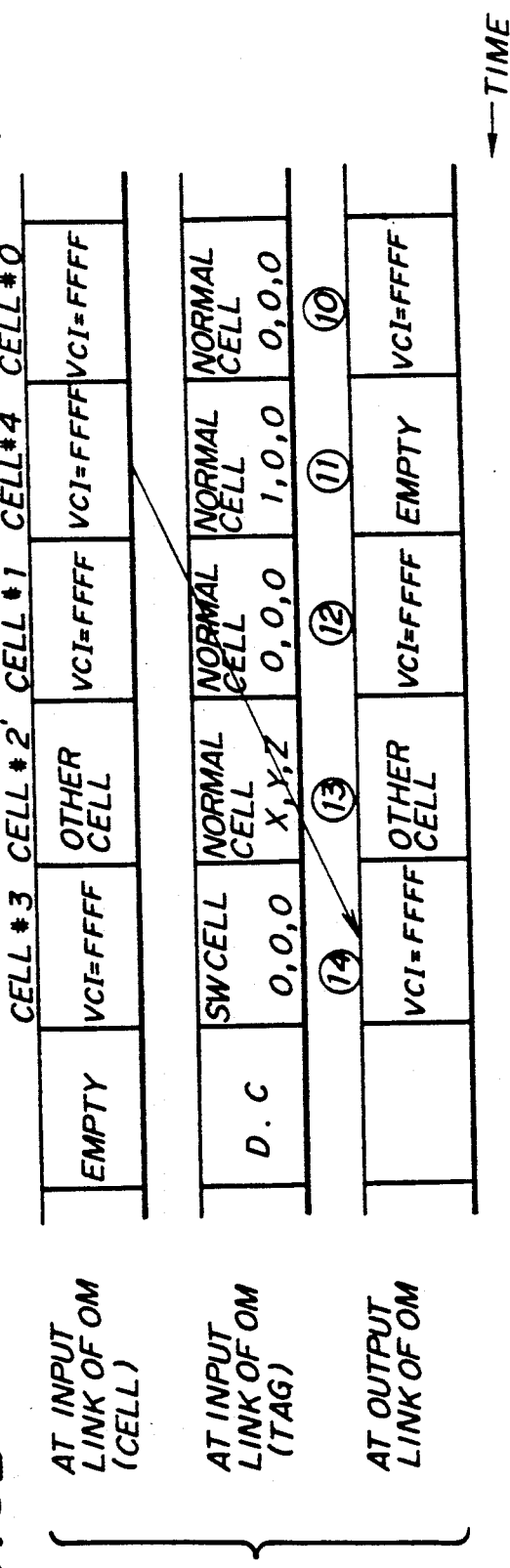

Next, a description will be given of a case where an old route within the ATM switching system 10 is switched to a new route by taking as an example a cell which has a VCI number VCI=0000(H) at the input link, with reference to FIGS.5, 6, 8 and 9. The old route includes the converter #0, the SRM #1, the link 0 of the SRM #1, the SRM #3, the link 0 of the SRM #3, the SRM #5, the link 0 of the SRM #5, and the output module #0 in FIG.4. On the other hand, the new link includes the converter #0, the SRM #1, the link 1 of the SRM #1, the SRM #4, the link 0 of the SRM #4, the SRM #5, the link 0 of the SRM #5, and the output module #0 in FIG.4. FIGS.8A and 8B are cell timing charts, and FIG.9 shows an operation sequence.

Figure 5:
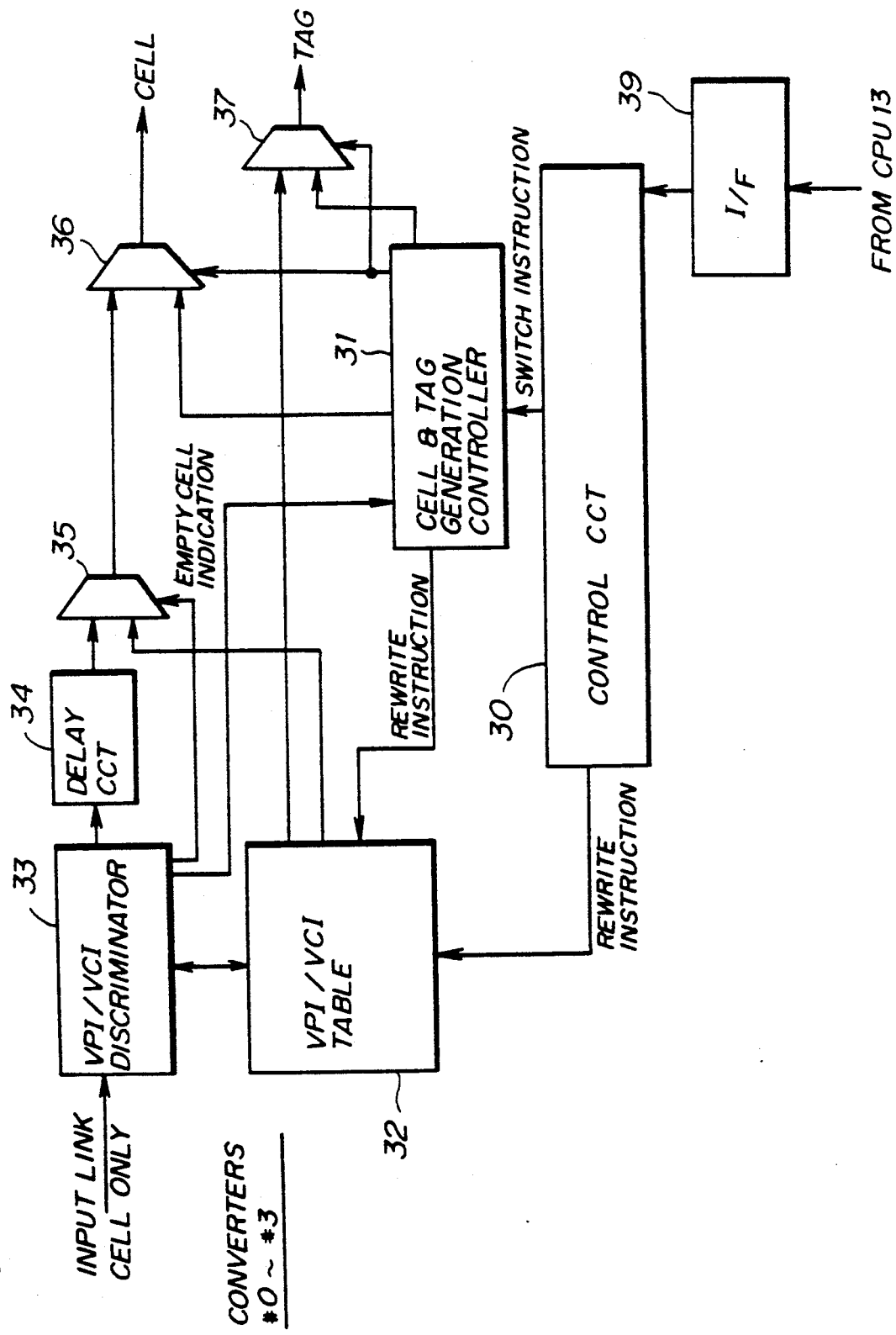
FIG.5 is a system block diagram showing an embodiment of a converter of the first embodiment shown in FIG.4.

When a cell #0 having the VCI number VCI=0000(H) shown in FIG.8A is input to the converter #0, a VPI/VCI discriminator part 33 shown in FIG.5 discriminates the VCI number and refers to a VPI/VCI table 32 shown in FIG.10 to look up a corresponding VCI number VCI=FFFF(H) on the output link of the converter #0. A selector 35 adds a VCI number VCI=FFFF(H) to the header of a cell #1, the timing of which is adjusted by a delay circuit 34. As shown in FIG.10, the VPI/VCI table 32 stores the VPI/VCI number and the tag information (kind of cell and routing information) on the output link of the converter #0 in correspondence with the VPI/VCI number on the input link of the converter #0. The tag information which indicates the kind of cell (0) indicating normal cell and the routing information (000) read from the VPI/VCI table 32, and the cell and the tag indicated by ⓪ in FIG.8A are obtained in a step 100 shown in FIG.9 by switching selectors 36 and 37 by a cell and tag generation controller 31. The cell and the tag are obtained in a step 101 shown in FIG.9 by an operation similar to the above when the cell #1 having the VCI number VCI =0000(H) is input to the converter #0.

An operation similar to the above is also carried out when a cell #2 having another VCI number is input to the converter #0, and the cell and the tag indicated by ② in FIG.8A are obtained.

When the SRM #3 shown in FIG.4 generates a congestion when processing the cell #2, the CPU 13 decides to switch the route of the cell which has the VCI number 0000(H) on the input link of the converter #0 in order to reduce the load on the SRM #3.

Figure 11:
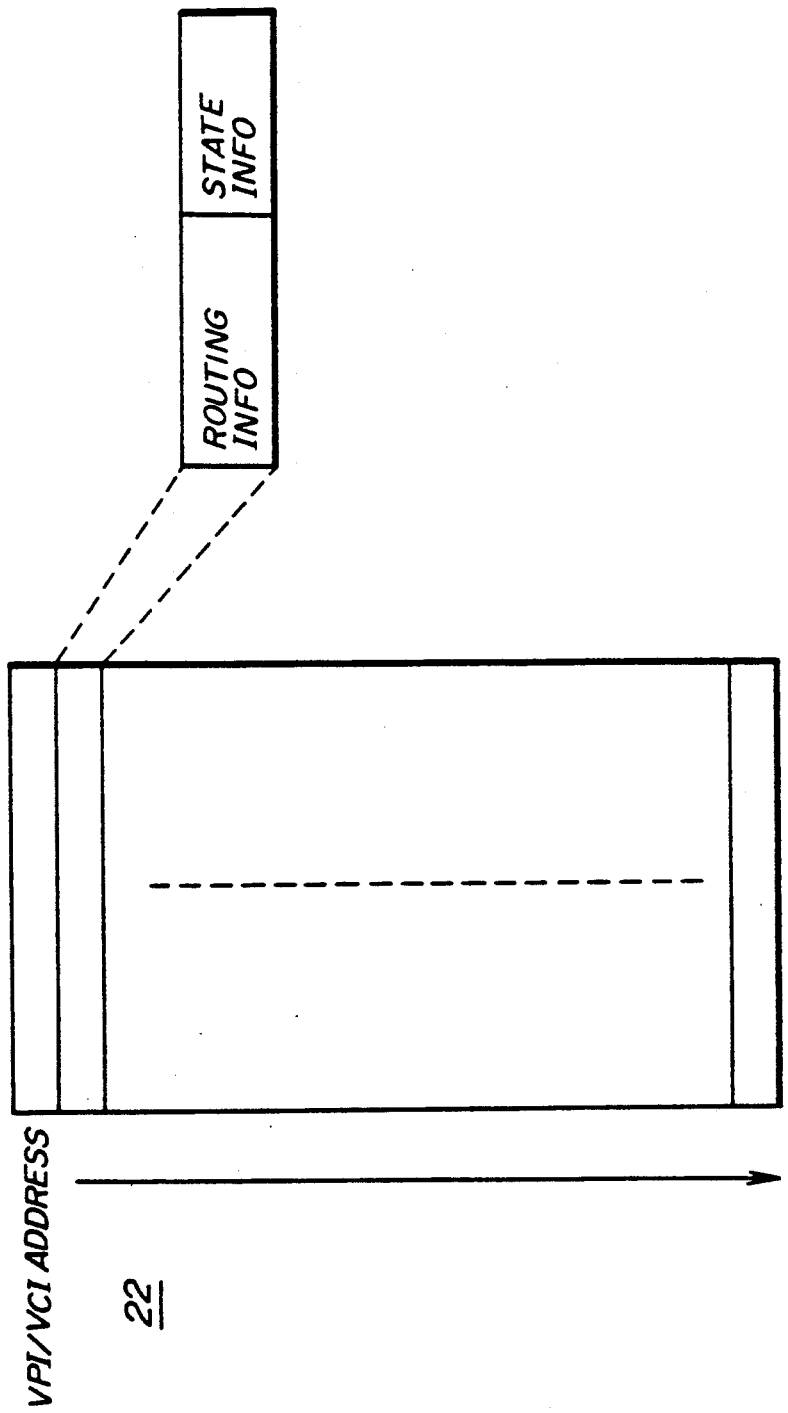
FIG.11 is a diagram for explaining a VPI/VCI table of the output module.

The CPU 13 notifies the output module #0 to change the routing information of the cell having the VCI number VCI=FFFF(H) (VCI=0000(H) at the input link of the converter #0 becomes VCI=FFFF(H) at the output link of the converter #0) from "000" (X=0, Y =0, Z=0) to "100" (X=1, Y=0, Z=0) in a step 102 shown in FIG.9. A control circuit 20 of the output module #0 shown in FIG.6 assigns a FIFO memory 21₁ in response to a route switching instruction from the CPU 13 which is received via an interface (I/F) 29, and rewrites the VPI/VCI table 22. The state of the cell having the VCI number VCI=FFFF(H) is rewritten from the "normal state" (00) to a "switching state" (01), and in addition, the routing information is rewritten from (000) to (100). As shown in FIG.11, the routing information and the cell state information are set for every VPI/VCI number in the VPI/VCI table 22.

On the other hand, the CPU 13 instructs the converter #0 via an interface (I/F) 39 to switch the route of the cell having the VCI number VCI=0000(H) on the input link of the converter #0 in a step 103 shown in FIG.9. A control circuit 30 of the converter #0 shown in FIG.5 notifies the VCI number VCI=0000(H), the old routing information (000) before the switching and the new routing information (100) after the switching to the cell and tag generation controller 31 in response to the route switching instruction which is obtained from the CPU 13 via the interface 39. In this state, the VPI/VCI discriminator part 33 shown in FIG.5 detects the incoming cell #2 shown in FIG.8A and having the VCI number which is "empty", assuming that the cell #3 is an empty cell following the cell #2. The empty cell refers to a cell in which the VPI/VCI number is "empty", that is, a cell which is not used for transfer of information. Hence, the cell and tag generation controller 31 outputs a signal which indicates the kind of cell (1) in the tag, that is, the route switching confirmation cell. By the switching of the selectors 36 and 37, the cell indicated by ③ in FIG.8A having the VCI number VCI=FFFF(H), the tag indicating the kind of cell (1) which is the route switching confirmation cell, and the routing information (000) are obtained in a step 104 shown in FIG.9. Thereafter, the cell and tag generation controller 31 rewrites routing information of the VPI/VCI table 32 corresponding to VCI=FFFF(H) on the output link of the converter #0 to the new routing information (100) in a step 105 shown in FIG. 9.

When a cell #4 shown in FIG.8A having the VCI number VCI=0000(H) is received following the cell #3, the new routing information (100) is obtained from the VPI/VCI table 32 because the routing information is already rewritten to the new routing information (100). By the switching of the selectors 36 and 37, the cell indicated by ④ in FIG.8A and the tag are obtained in a step 106 shown in FIG.9. For a cell #5 and the cells which follow, the cells having the VCI number VCI =0000(H) are obtained with a format similar to that of the cell #4. Since the cells #2 and #5 have VCI numbers different from VCI=0000(H), these cells #2 and #5 pass through the converter #0 but are not supplied to the output module #0.

The cells #0, #1, . . . which are obtained from the converter #0 are subjected to the switching process in the ATM switching system 10 shown in FIG.4 and pass a route dependent on the routing information. But since the new route (100) is free, it is assumed that a cell which takes the new route goes ahead of a cell which takes the old route as shown in FIG.8B. A description will be given of the operation of the output module #0 in this case.

In FIG.8B, it is assumed that the cell #0 which takes the old route, the cell #4 which takes the new route, the cell #1 which takes the old route, a cell #2′ which is input to the output module #0 but is uncertain of the converter from which this cell originates, and the cell #3 which takes the old route are obtained at the input link of the output module #0. In this case, the cell #4 which takes the new route goes ahead of the cells #1, #2′ and #3 which take the old route. The cell #0 shown in FIG.8B is obtained from the old route in the step 100 shown in FIG.9. The VCI number VCI=FFFF(H) of this cell #0 is detected in a VPI/VCI and tag detector 23 shown in FIG.6, and the VPI/VCI and the tag (routing information) are supplied to the control circuit 20 for comparison with the routing information and the state information which are obtained from the VPI/VCI table 22. The state information of the VPI/VCI table 22 is already rewritten to the "switching state" (01) by the route switching instruction from the CPU 13 which is obtained via the interface 29. In this case, the routing information (000) of the cell #0 and the routing information (100) from the VPI/VCI table 22 differ. Hence, a switch 24 and a selector 25 are switched by a control of the control circuit 20 so that the cell #0 which is obtained via the detector 23 is not stored in the FIFO memory 21₁ but is output as it is to the output link of the output module #0 in a step 107 shown in FIG.9 and indicated by ⑩ in FIG.8B.

Next, when the cell #4 is received at the input link of the output module #0 in the step 106 shown in FIG.9, the comparison of the routing information is made in the control circuit 20 by a procedure similar to the procedure described above. In this case, because the cell #4 is obtained from the new route, the routing information thereof is (100). Hence, the routing information (100) of the cell #4 and the routing information (100) of the VPI/VCI table 22 are the same. In addition, the state information of the VPI/VCI table 22 is the "switching state" (01). Therefore, the cell #4 is stored in the FIFO memory 21₁ by switching the switch 24 by the control of the control circuit 20 in a step 108 shown in FIG.9. In this state, an empty cell is output on the output link of the output module #0 as indicated by ⑪ in FIG.8B. If there exists a cell which has the same routing information (100) as the cell #4, this cell is also stored in the same FIFO memory $21_1$.

Next, when the cell #1 is received at the input link of the output module #0, this cell #1 is output to the output link of the output module #0 as it is by the switching of the switch 24 and the selector 25 in a step 109 shown in FIG.9 as indicated by ⑫ in FIG.8B, similarly as in the case of the cell #0 because the cell #1 also takes the old route. The next cell #2 is also output to the output link of the output module #0 as it is as indicated by ⑬ in FIG.8B, similarly as in the case of the cells #0 and #1.

When the cell #3 (route switching confirmation cell) is received at the input link of the output module #0 in the step 104 shown in FIG.9, the detector 23 detects this route switching confirmation cell #3 and the control circuit 20 instructs a read with respect to the FIFO memory $21_1$ and also switches the selector 5. Accordingly, the cell #4 which is stored in the FIFO memory $21_1$ is read out and output to the output link in a step 110 shown in FIG.9 as indicated by ⑭ in FIG.8B. At the same time, the control circuit 20 rewrites the state information of the VPI/VCI table 22 from the "switching state" (01) to the "sweep-out state" (11). When the FIFO memory $21_1$ becomes empty by the read out, the control circuit 20 rewrites the state information of the VPI/VCI table 22 to the "normal state" (00), and the normal cells which are thereafter received via the new route described by the routing information (100) are output as they are in a step 111 shown in FIG.9. If there exists a cell other than the cell #4 which is stored in the FIFO memory $21_1$, this cell is output to the output link of the output module #0 under the control of the detector 23 which detects the empty cell shown in FIG.8B and the control circuit 20 which switches the selector 25.

Although the cell #4 which takes the new route goes ahead of the cell which takes the old route and the cells #0, #4, #1, #2, and #3 are received at the input link of the output module #0 in this sequence, the cells are obtained with the correct sequence at the output link of the output module #0 as indicated by ⑩ through ⑭ in FIG.8B. The correct sequence is formed by the cell #1 having the VCI number VCI=FFFF(H), the empty cell which is a cell from another converter, the cell #1 having the VCI number VCI=FFFF(H), the cell #2′ which is a cell with a different VCI number, and the cell #4 which is obtained in place of the empty cell #3. In this case, no long delay time is introduced between the cells as in the conventional system which stores the cells which are to take the new route for the predetermined time at the input end of the ATM switching system. Therefore, the subsequent signal processing can be carried out efficiently within a short time according to this embodiment.

Figure 6:
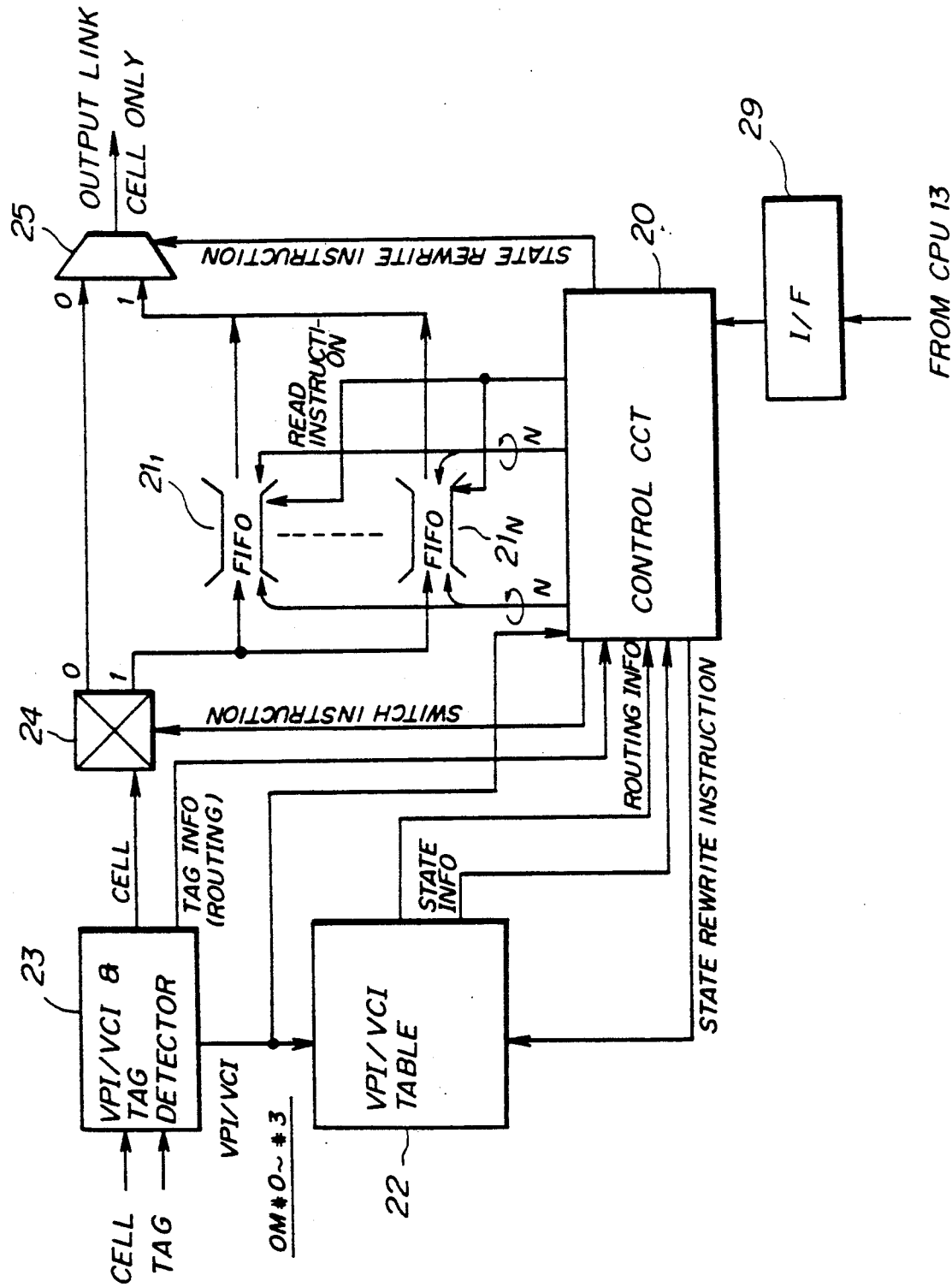
FIG.6 is a system block diagram showing an embodiment of an output module of the first embodiment shown in FIG.4.
Figure 12:
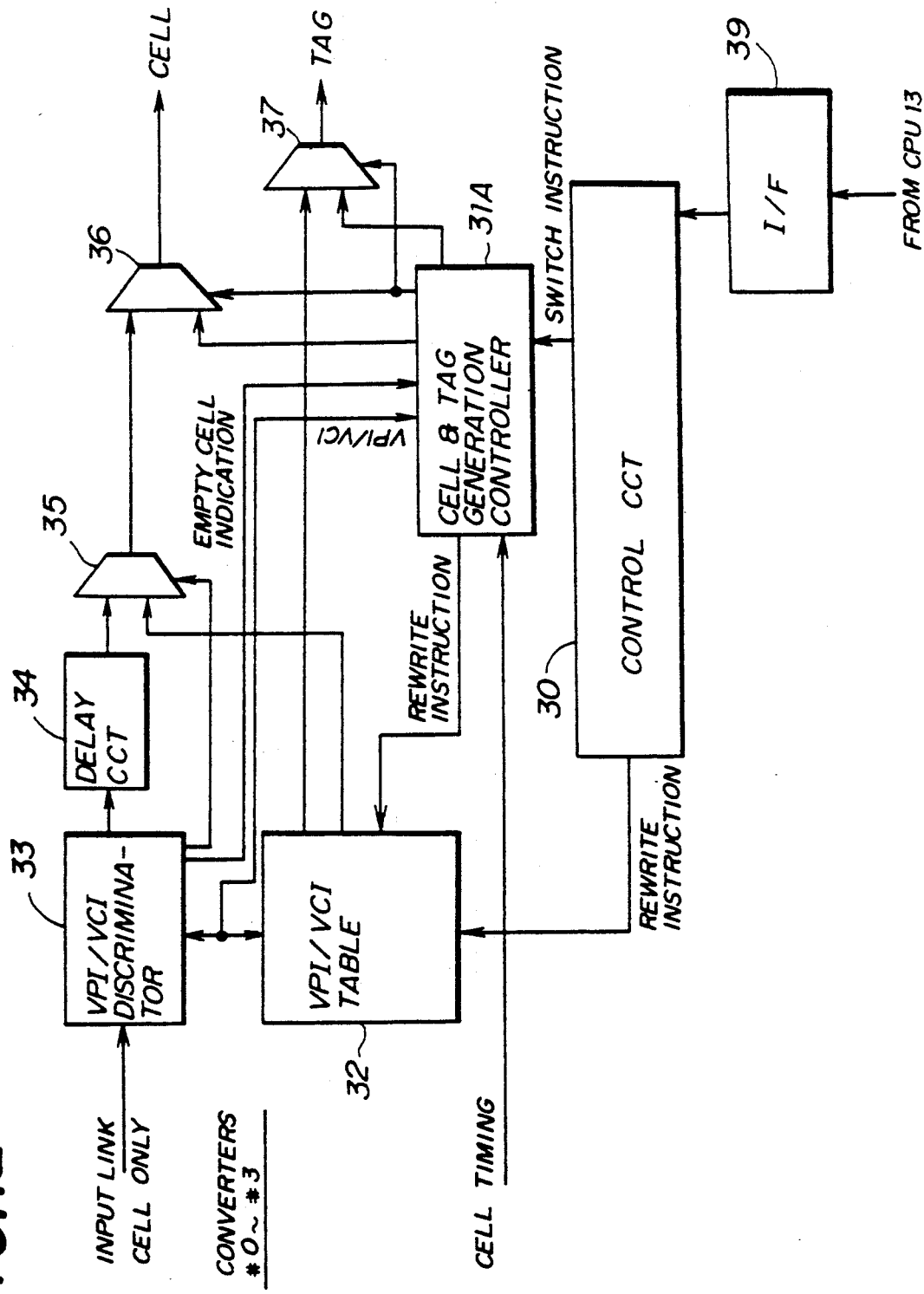
FIG.12 is a system block diagram showing an embodiment of a converter of a second embodiment of the routing system according to the present invention.
Figure 13:
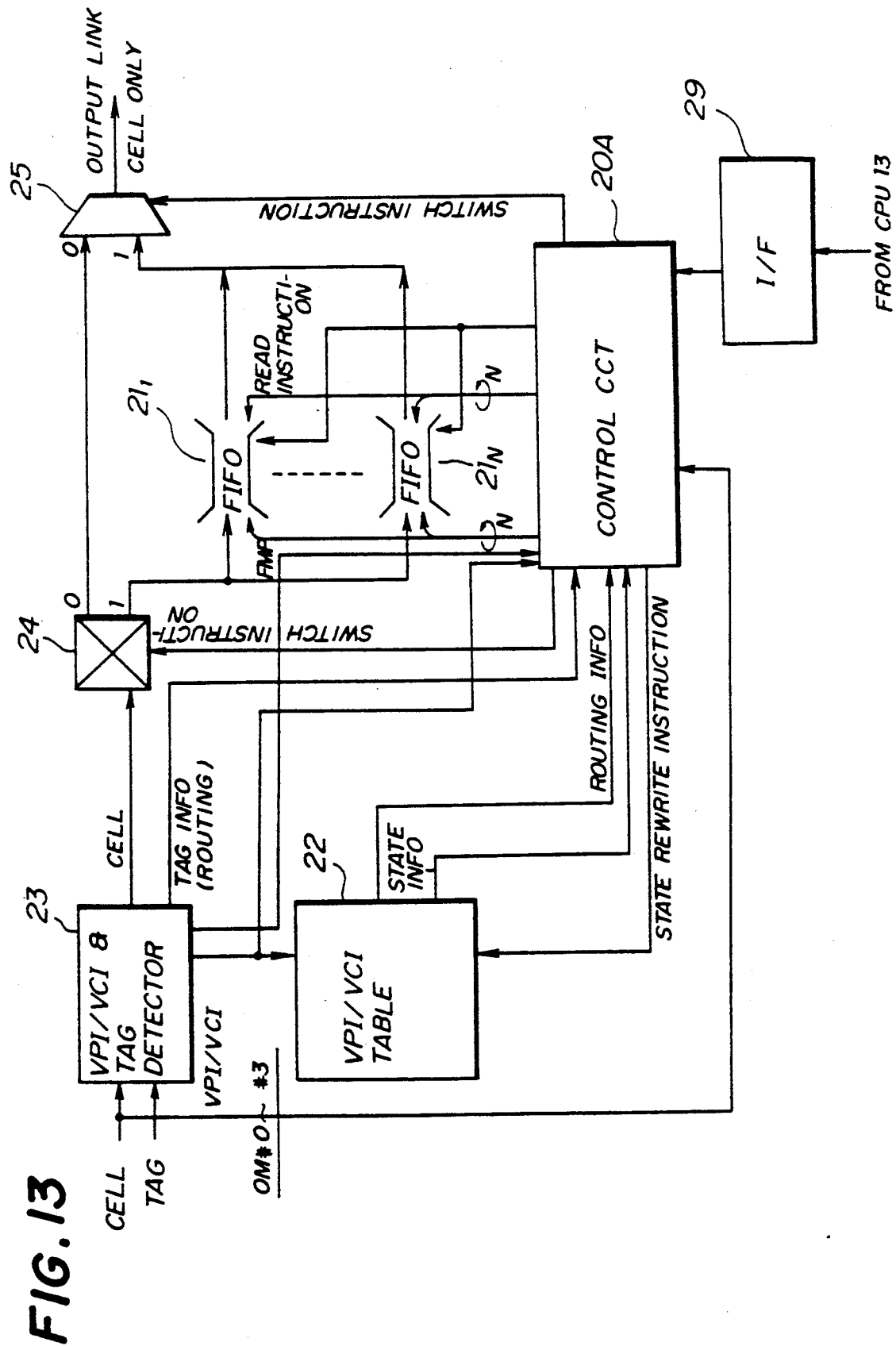
FIG.13. is a system block diagram showing an embodiment of an output module of the second embodiment.

Next, a description will be given of a second embodiment of the routing system according to the present invention. In this second embodiment, the block system shown in FIG.4 is also used. However, the converters #0 through #3 of the VPI/VCI converter part 11 respectively have a structure shown in FIG.12, and the output modules #0 through #3 of the output module part 12 respectively have a structure shown in FIG.13. In FIG.12, those parts which are the same as those corresponding parts in FIG.5 are designated by the same reference numerals, and a description thereof will be omitted. In FIG.13, those parts which are the same as those corresponding parts in FIG.6 are designated by the same reference numerals, and a description thereof will be omitted. In addition, for the sake of convenience, it is assumed that cells similar to those described in conjunction with the first embodiment are input to the converter #0 and output to the output module #0.

In FIG.12, the discrimination result of the VPI/VCI discriminator 33 indicative of the VPI/VCI is also supplied to a cell and tag generation controller 31A. In addition, a signal indicative of a cell timing is supplied to the cell and tag generation controller 31A.

In FIG.13, a signal EMP indicative of the empty cell is supplied from the VPI/VCI and tag detector 23 to a control circuit 20A. In addition, the cell which is supplied to the VPI/VCI and tag detector 23 is also supplied to the control circuit 20A.

In the first embodiment, the cell identification field CIP of the tag shown in FIG.7B is made up of 1 bit to indicate the normal cell when CIP=0 and the route switching confirmation cell when CIP=1. However, in this second embodiment, the cell identification field CIP of the tag is made up of 2 bits. The normal cell is indicated by CIP=00, the route switching confirmation cell which is an empty cell is indicated by CIP=10, and the route switching confirmation cell which is a normal cell is indicated by CIP=11. CIP=01 indicates a don't care.

Figure 14:
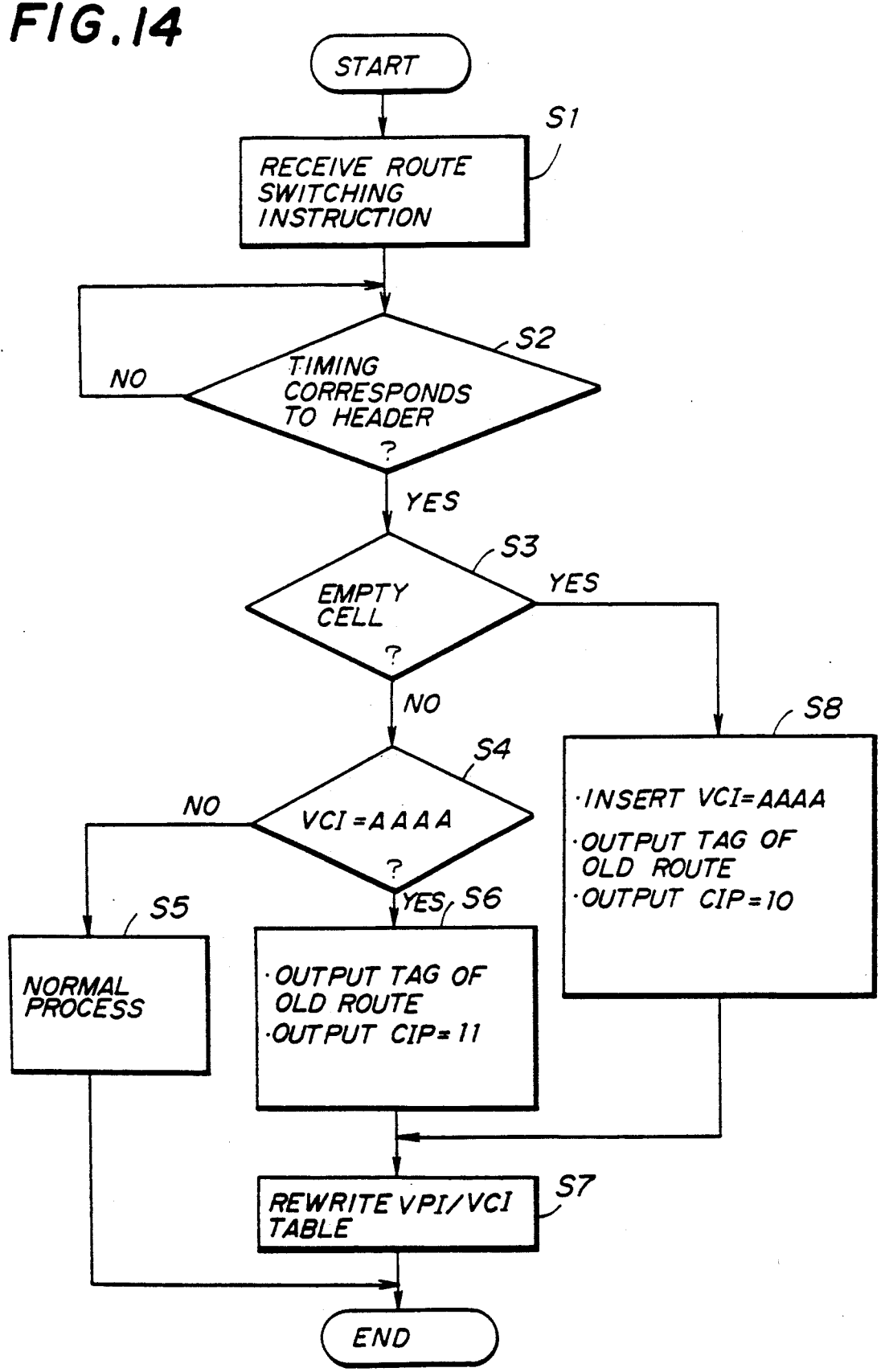
FIG.14 is a flow chart for explaining an operation of a cell and tag generation controller within the converter shown in FIG.12.

FIG.14 shows an embodiment of an operation of the cell and tag generation controller 31A shown in FIG.12 when switching the route. When a route switching instruction is received from the CPU 13 via the interface 39 in a step S1, a step S2 judges whether or not the timing corresponds to the header of the cell based on the signal which indicates the cell timing. When the judgment result in the step S2 becomes YES, a step S3 judges whether or not the cell is an empty cell. When the judgment result in the step S3 is NO, a step S4 judges whether or not the VCI number VCI=AAAA, where A denotes a variable. A step S5 carries out a normal process of controlling the selectors 36 and 37 to output the cell and the tag input to the converter #0, and the process ends.

On the other hand, when the judgment result in the step S4 is YES, a step S6 controls the selector 37 to output the tag of the old route and outputs the cell identification field CIP=11. Then, a step S7 supplies a rewrite instruction to the VPI/VCI table 32 to rewrite the VPI/VCI table 32, and the process ends.

When the judgment result in the step S3 is YES, a step S8 inserts VCI=AAAA into the VCI number, outputs the tag of the old route, and outputs the cell identification field CIP=10. After the step S8, the process advances to the step S7.

Figure 15:
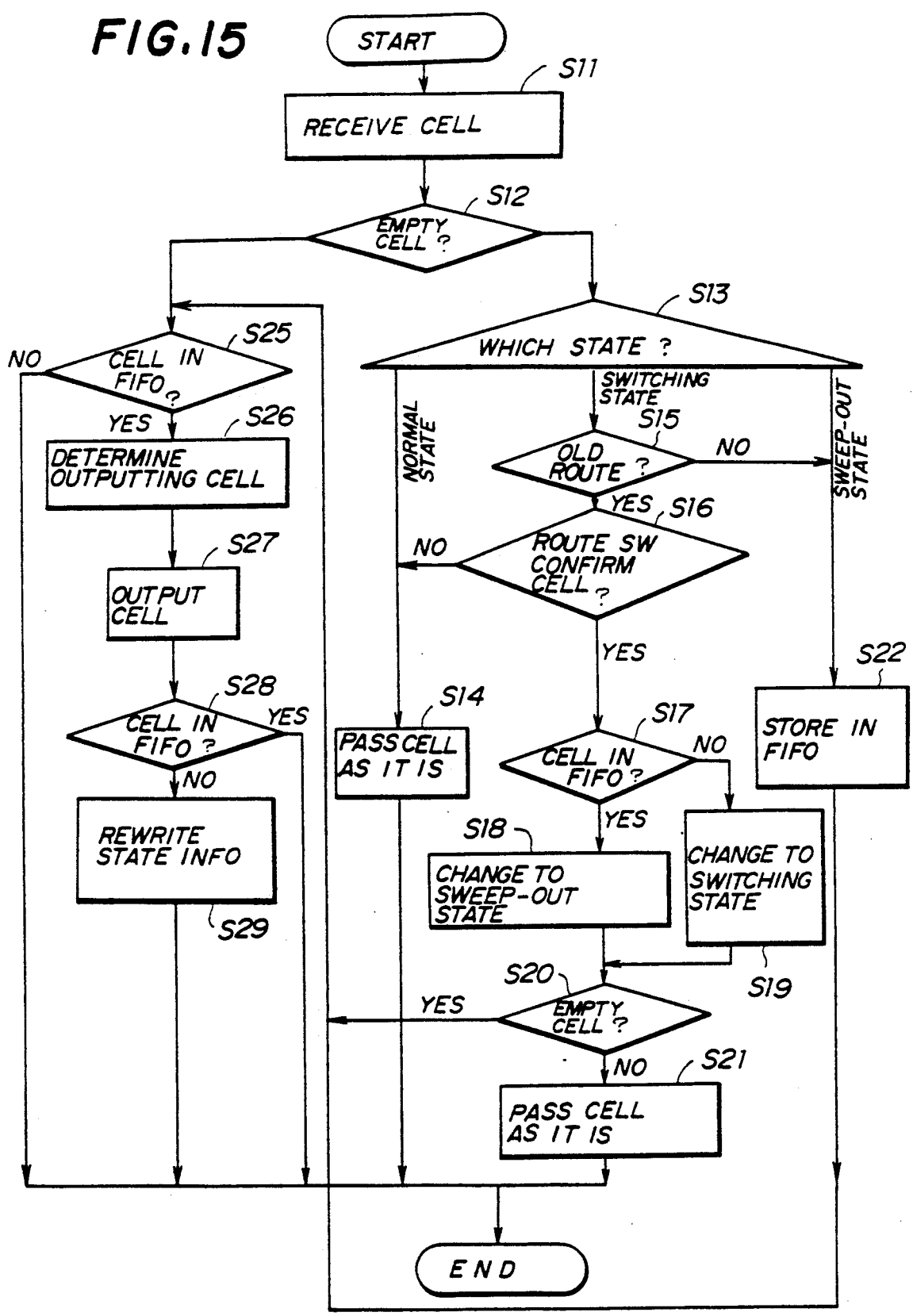
FIG.15 is a flow chart for explaining an operation of a control circuit within the output module shown in FIG.13.

FIG.15 shows an embodiment of an operation of the control circuit 20A shown in FIG.13. When a cell is received in a step S11, a step S12 judges whether or not the cell is an empty cell. When the judgment result in the step S12 is NO, a step S13 judges whether or not the state of the cell is the "switching state" (01), the "normal state" (00), or the "sweep-out state" (11).

When the "normal state" (00) is detected in the step S13, a step S14 controls the selector 25 to pass the cell as it is, and the process ends.

When the "switching state" (01) is detected in the step S13, a step S15 judges whether or not the cell is obtained through the old route. The process advances to a step S22 which will be described later when the judgment result in the step S15 is NO. A step S16 judges whether or not the cell is a route switching confirmation cell when the judgment result in the step S15 is YES. The process advances to the step S14 when the judgment result in the step S16 is NO. On the other hand, when the judgment result in the step S16 is YES, a step S17 judges whether or not a cell is stored in the assigned FIFO memory $21_i$, for example. A step S18 changes the state to the "sweep-out state" when the judgment result in the step S17 is YES, and a step S19 changes the state to the "normal state" when the judgment result in the step S17 is NO. After the step S18 or S19, a step S20 judges whether or not the cell is an empty cell. The process advances to a step S25 which will be described later when the judgment result in the step S20 is YES. But when the judgment result in the step S20 is NO, a step S21 passes the cell as it is and the process ends.

On the other hand, when the step S13 detects the "sweep-out state", the step S22 stores the cell into the assigned FIFO memory $21_i$, for example, and the process advances to the step S25.

The step S25 judges whether or not a cell is stored in the assigned FIFO memory $21_i$, for example. The process ends when the judgment result in the step S25 is NO. On the other hand, when the judgment result in the step S25 is YES, a step S26 carries out a routine for determining the output cell. A step S27 outputs the cell from the FIFO memory $21_i$, for example, based on the routine carried out in the step S26. A step S28 judges whether or not there still exists a cell in the FIFO memory $21_i$, for example. The process ends when the judgment result in the step S28 is YES. On the other hand, when the judgment result in the step S28 is NO, a step S29 rewrites the state information of the VCI which is assigned to the FIFO memory $21_i$ to the "normal state" and the process ends.

Figure 16A:
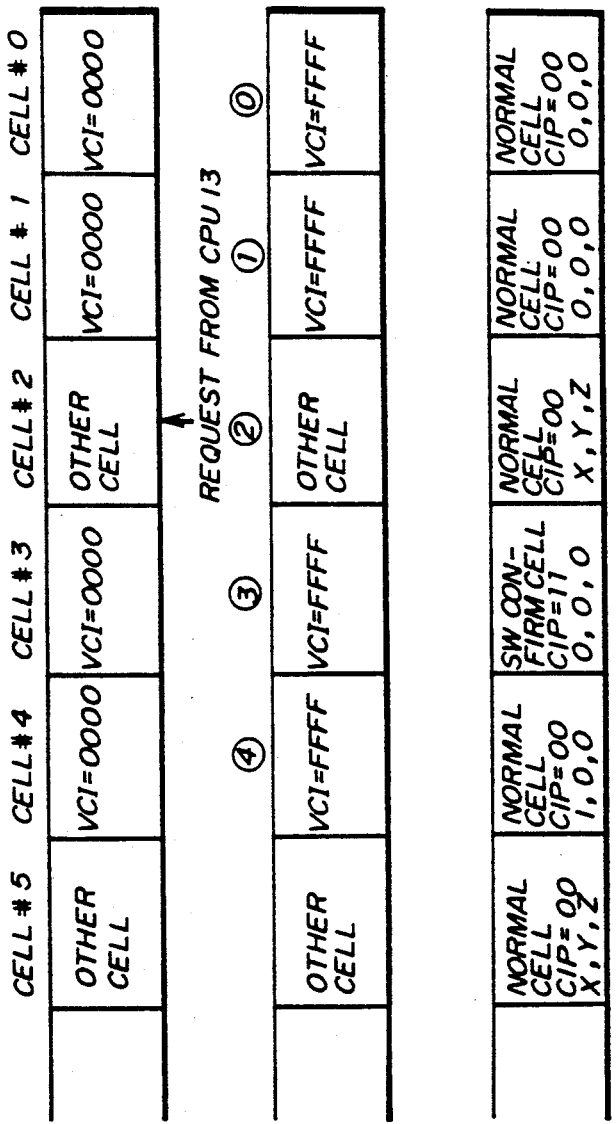
FIGS.16A and 16B are cell timing charts for explaining an operation of the second embodiment.
Figure 16B:
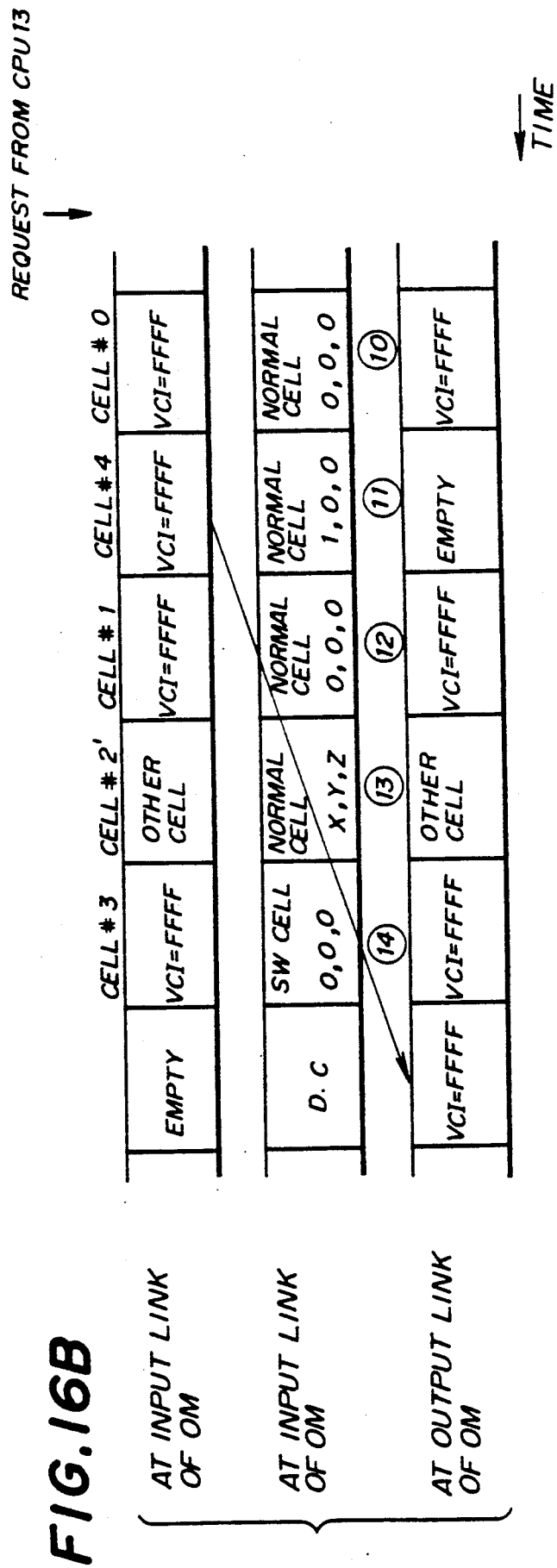

Therefore, in this second embodiment, the cell timings at the input and output stages of the ATM switching system 10 respectively become as shown in FIGS. 16A and 16B. In FIGS. 16A and 16B, the same designations are used as in FIGS. 8A and 8B, and a description thereof will be omitted. In this second embodiment, it is assumed that the cell #3 has the VCI number VCI=0000 at the input link of the converter #0 as shown in FIG. 16A. The cell identification field CIP of the cells at the output link of the converter #0 is indicated as shown in FIG. 16A.

As shown in FIG. 16B, the cell #3 is output to the output link of the output module #0 as it is, and the outputting of the cell #4 from the output module #0 waits until the cell #3 is output to the output link of the output module #0 and an empty cell is input to the input link of the output module #0. In other words, unlike the first embodiment which outputs the cell #4 in place of the cell #3, the cell #3 is output as it is and the outputting of the cell #4 waits until the empty cell is received in a step 150 shown in FIG. 17. FIG. 17 shows an operation sequence of the second embodiment. In FIG. 17, the same designations are used as in FIG. 9, and a description thereof will be omitted.

Of course, as a modification of the second embodiment, the outputting of the cell #4 may wait until a cell having a VPI/VCI number corresponding to that of the cell #4 is received.

Moreover, as another modification of the second embodiment, the outputting of the cell #4 may wait until the empty cell is received or the cell having the VPI/VCI number corresponding to that of the cell #4 is received, whichever occurs first.

Further, the present invention is not limited to these embodiments, but various variations and modifications may be made without departing from the scope of the present invention.

What is claimed is:

1. A routing method for routing cells which are transferred through one of a plurality of paths within an asynchronous transfer mode switching system selected by routing information, each of the cells including a header and an information field, said routing method comprising the steps of:

adding first routing information to incoming cells at an input stage o the asynchronous transfer mode switching system when supplying the incoming cells to the asynchronous transfer mode switching system;

generating a route switching confirmation cell in response to a route switching instruction and adding second routing information to incoming cells thereafter so as to supply the route switching confirmation cell an the incoming cells having the second rotating information added thereto, to the asynchronous transfer mode switching system, the second routing information being different from the first routing information a and being determined by the route switching instruction;

comparing routing information o of the incoming cells with the second courting information at an output stage of the asynchronous transfer mode switching system in response to the route switching instruction;

outputting rom the asynchronous transfer mode switching system each of the cells having routing information different from eh second routing information; and temporarily storing each of the cells from the asynchronous transfer mode switching system having routing information identical to the second routing information and reading out and outputting the stored cell after the route switching confirmation cell is output from the asynchronous transfer mode switching system.

2. The outing method as claimed in claim 1, wherein the outing information of each of the cells includes a cell identification field or indicating whether the cell is the route switching confirmation cell of a normal cell other than the h route switching confirmation cells, and an information field for indicating paths to e selected within the asynchronous transfer mode switching system for each stage of the asynchronous transfer mode switching system.

3. The routing method as claimed in claim 1, wherein the header of each cell includes a virtual channel field which indicates an address of a virtual channel at an output stage of the asynchronous transfer mode switching system.

4. The routing method as claimed in claim 3, wherein the virtual channel field of the header indicates the address of the virtual channel by a virtual path identifier and a virtual channel identifier.

5. The routing method as claimed in claim 4, wherein the virtual path identifier is fixed.

6. The routing method as claimed in claim 3, wherein the virtual channel field of the header indicates the address of the virtual channel by a virtual path identifier.

7. The routing method as claimed in claim 3, wherein said step of temporarily storing each cell from the asynchronous transfer mode switching system includes reading out and outputting the stored cell in place of an arbitrary cell which is not used for transfer of information.

8. The routing method as claimed in claim 7, wherein the arbitrary cell is the route switching confirmation cell.

9. The routing method as claimed in claim 3, wherein said step of temporarily storing teach cell from the asynchronous transfer mode switching system includes reading out and outputting the stored cell in place of an arbitrary cell whcih has outing information different from the second routing information and has a virtual channel field which is identical to that of the stored cell.

10. The routing method as claimed in claim 3, wherein said step of temporarily storing each cell from the asynchronous transfer mode switching system includes reading out and outputting the stored cell in place of a first arbitrary cell which is not used or transfer of information, or reading out and outputting the stored cell in place of a second arbitrary cell which has routing information different from the second outing information and has a virtual channel field which is identical to that of the stored cell, whichever occurs first.

11. The routing method as claimed in claim 10, wherein the first arbitrary cell is the route switching confirmation cell.

12. The routing method as claimed in claim 1, which further comprises the step of outputting an empty cell when said step of temporarily storing each cell from eh asynchronous transfer mode switching system temporarily stores a cell.

13. A routing system for routing cells which are transferred through one of a plurality of paths within an asynchronous transfer mode switching system selected by routing information, each of the cells including a header and an information field, said asynchronous transfer mode switching system having an input stage and and output stage, said routing system comprising:
  a converter part coupled to the input stage o the asynchronous transfer mode switching system a nd including:
    first means for adding first routing information to incoming cells when supplying the incoming cells to the asynchronous transfer mode switching system; and
    second means for generating a route switching confirmation cell in response to a route switching instruction and for adding second routing information to the incoming cells thereafter, so as to supply the route switching confirmation cell and the cells to whcih the second routing information has been added, to the asynchronous transfer mode switching system the second routing information being different from eh first routing information and being determined by the route switching instruction; and
  an output module part coupled to the output stage o the asynchronous transfer mode switching system, including:
    third means for comparing routing information of the cells with the second outing information in response to the route switching instruction;
    fourth means for outputting each cell from the asynchronous transfer mode switching system having routing information different from the second courting information; and
    fifth means for temporarily storing each cell from the asynchronous transfer mode switching system having routing information identical to the second routing information and reading out and outputting the stored cell after the route switching confirmation cell is output from eh asynchronous transfer mode switching system.

14. The routing system as claimed in claim 13, wherein the routing information of each cell includes a cell identification field for indicating whether the cell is the route switching confirmation cell or a normal cell other than the route switching confirmation el, and an information field for indicating paths to be selected within the asynchronous transfer mode switching system for each stage of the asynchronous transfer mode switching system.

15. The routing system as claimed in claim 14, wherein said converter part has input and output links, and wherein the header of each cell includes a virtual channel at the output stage of the asynchronous transfer mode switching system, and said first and second means of said converter part include:
  a discriminator for discriminating the virtual channel field of each incoming cell;
  a first table, coupled to said discriminator, for storing addresses of virtual channels at the output link of said converter part and storing the first routing information in correspondence with addresses of the virtual channel at the input link of said converter part; and
  a control part, coupled to said discriminator and said first table, for adding the first routing information to the incoming cells by referring to said first table and for rewriting the first routing information of said first table to the second routing information in respect to the route switching instruction, so as to add the second routing information o the incoming cells after rewriting said first table.

16. The routing system as claimed in claim 15, wherein said control part rewrites the cell identification field of a certain cell to indicate the route switching confirmation el when said discriminator discriminates that said virtual channel field of said certain cell is empty.

17. The routing system as claimed in claim 15, wherein the virtual channel field of the header indicates the address of the virtual channel by a virtual path identifier and a virtual channel identifier.

18. The routing system as claimed in claim 17, wherein the virtual path identifier is fixed.

19. The routing system as claimed in claim 15, wherein the virtual channel field of the header indicates the address of the virtual channel by a virtual path identifier.

20. The routing system as claimed in claim 15, wherein said fifth means of said output module part reads out and outputs the stored cell in place of an arbitrary cell which is not used for transfer of information.

21. The routing system as claimed in claim 20, wherein the arbitrary cell is the route switching confirmation cell.

22. The routing system as claimed in claim 15, wherein said fifth means of said output module part reads out and outputs the stored cell in place of an arbitrary cell which has routing information different from the second routing information and has a virtual channel field which is identical to that of the stored cell.

23. The routing system as claimed in claim 15, wherein said fifth means of said output module part reads out and outputs the stored cell in place of a first arbitrary cell which is not used for transfer of information, or reads out and outputs the stored cell in place of a second arbitrary cell which has routing information different from the second routing information and has a virtual channel field which is identical to that of the stored cell, whichever occurs first.

24. The routing system as claimed in claim 23, wherein said first arbitrary cell is said route switching confirmation cell.

25. The routing system as claimed in claim 15, wherein said third through fifth means of said output module part include:
   a detector for detectign the virtual channel field and the routing information of each incoming cell and providing a detected result;
   a second table, coupled to said detector, for storing the second routing information;
   memory means for temporarily storing one or a plurality of cells;
   selector means for selectively passing a cell output from the asynchronous transfer mode switching system or a cell read out from the said memory means responsive to a control signal; and
   a control part, coupled to said detector, said second table, said memory means and said selector means, for temporarily storing each cell for eh asynchronous transfer mode switching system having the routing information identical to the second routing information stored in said second table based on the detected result obtained from said detector and for outputting said control signal, so that said selector means passes a certain cell output from the asynchronous transfer mode switching system when the defected result from said detector indicates that the certain cell has routing information different from the second courting information.

26. The routing system as claimed in claim 25, wherein said control pat supplies the control signal to said selector means based on the detected result from said detector, so that the stored el read out from said memory mans is output from said selector means in place of an arbitrary cell which is not sued for transfer of information.

27. The routing system as claimed in claim 26, wherein said arbitrary cell is said route switching confirmation cell.

28. The routing system as claimed in claim 25, wherein said control part supplies the control signal to said selector means based on the detected result from said detector means so that the stored cell read out from said memory means is output from said selector means in place of an arbitrary cell which has routing information different from the second routing information, and has a virtual channel field which is identical to that of the stored cell.

29. The routing system as claimed in claim 25, wherein said control part supplies the control signal to said selector means- based on the detected result from said detector means, so that the stored cell read out from said memory means is output from said selector means in place of a first arbitrary cell which is not used for transfer of information, or in place of a second arbitrary cell which has routing information different from the second routing information and has a virtual channel field which is identical to that of the stored cell, whichever occurs first.

30. The routing system as claimed in claim 29, wherein said first arbitrary cell is said route switching confirmation cell.

31. The routing system as claimed in claim 25, wherein said control means includes means for outputting an empty cell when said memory means temporarily stores a cell from the asynchronous transfer mode switching system.

* * * * *

UNITED STATES PATENT AND TRADEMARK OFFICE
CERTIFICATE OF CORRECTION

PATENT NO. : 5,084,867

DATED : JANUARY 28, 1992

INVENTOR(S) : TETSUO TACHIBANA ET AL.

It is certified that error appears in the above-identified patent and that said Letters Patent is hereby corrected as shown below:

TITLE PAGE, after section [22] insert the following:

--[30] Foreign Application Priority Data

Sept. 19, 1989 [JP] Japan ....1-242454--;

TITLE PAGE, Col. 2, [57] ABSTRACT line 16, "tion," should be --tion. The method also includes--;
line 16, "information. The method also" should be --information of--;
line 17, "includes" should be deleted.

Col. 12, line 13, "o" should be --of--;
line 21, "an" should be --and--;
line 25, "a" should be deleted;
line 27, "o" should be deleted;
line 28, "courting" should be --routing--;
line 32, "rom" should be --from--;
line 34, "eh" should be --the--;
line 43, "outing" should be --routing--;
line 44, "outing" should be --routing--;
line 45, "or" should be --for--;
line 46, "of" should be --or--;
line 47, "h" should be deleted;
line 48, "e" should be --be--.

UNITED STATES PATENT AND TRADEMARK OFFICE
CERTIFICATE OF CORRECTION

PATENT NO. : 5,084,867

DATED : JANUARY 28, 1992

INVENTOR(S) : TETSUO TACHIBANA ET AL.

It is certified that error appears in the above-identified patent and that said Letters Patent is hereby corrected as shown below:

```
Col. 13, line 12, "whcih" should be --which--; and
                  "outing" should be --routing--;
         line 19, "or" should be --for--;
         line 22, "outing" should be --routing--;
         line 31, "eh" should be --the--;
         line 40, "and" (second occurrence) should be
                  --an--;
         line 41, "o" should be --of--;
         line 42, "a nd" should be --and--;
         line 53, "whcih" should be --which--;
         line 56, "eh" should be --the--;
         line 60, "o" should be --of--;
         line 63, "outing" should be --routing--;
         line 68, "courting" should be --routing--.

Col. 14, line  7, "eh" should be --the--;
         line 13, "el," should be --cell,--;
         line 38, "respect" should be --response--;
         line 39, "o" should be --to--;
         line 44, "el" should be --cell--.
```

UNITED STATES PATENT AND TRADEMARK OFFICE
CERTIFICATE OF CORRECTION

PATENT NO. : 5,084,867

DATED : JANUARY 28, 1992

INVENTOR(S) : TETSUO TACHIBANA ET AL.

It is certified that error appears in the above-identified patent and that said Letters Patent is hereby corrected as shown below:

```
Col. 15, line 19, "detectign" should be --detecting--;
         line 33, "eh" should be --the--.

Col. 16, line  2, "courting" should be --routing--;
         line  4, "pat" should be --part--;
         line  6, "el" should be --cell--;
         line  7, "mans" should be --means--;
         line 16, "means" should be --means,--;
         line 24, "means-" should be --means--.
```

Signed and Sealed this

Thirteenth Day of July, 1993

MICHAEL K. KIRK

*Acting Commissioner of Patents and Trademarks*